United States Patent
Suiter et al.

(10) Patent No.: US 10,108,859 B1
(45) Date of Patent: Oct. 23, 2018

(54) SYSTEM FOR CURATION, DISTRIBUTION AND DISPLAY OF LOCATION-DEPENDENT AUGMENTED REALITY CONTENT

(71) Applicants: Maximillian John Suiter, Omaha, NE (US); Scott David Morrison, Columbus, MT (US); Valerie Michele Morrison, Columbus, MT (US); Ian Padraic Suiter, Omaha, NE (US); Sean Patrick Suiter, Omaha, NE (US)

(72) Inventors: Maximillian John Suiter, Omaha, NE (US); Scott David Morrison, Columbus, MT (US); Valerie Michele Morrison, Columbus, MT (US); Ian Padraic Suiter, Omaha, NE (US); Sean Patrick Suiter, Omaha, NE (US)

(73) Assignee: Pipbin, Inc., Omaha, NE (US)

( * ) Notice: Subject to any disclaimer, the term of this patent is extended or adjusted under 35 U.S.C. 154(b) by 0 days.

(21) Appl. No.: 15/469,245

(22) Filed: Mar. 24, 2017

Related U.S. Application Data

(63) Continuation-in-part of application No. 15/231,241, filed on Aug. 8, 2016.

(Continued)

(51) Int. Cl.
  *G06K 9/00* (2006.01)
  *H04W 4/02* (2018.01)
  (Continued)

(52) U.S. Cl.
  CPC .......... *G06K 9/00684* (2013.01); *G06F 3/011* (2013.01); *G06F 17/241* (2013.01); *G06T 19/006* (2013.01); *H04W 4/025* (2013.01)

(58) Field of Classification Search
  CPC .. H04N 1/2125; H04N 1/212; H04N 1/00244; H04N 2201/0084;
  (Continued)

(56) References Cited

U.S. PATENT DOCUMENTS

| 9,104,293 B1 | 8/2015 | Kornfeld |
| 2007/0032244 A1* | 2/2007 | Counts ............... H04W 8/14 455/456.1 |

(Continued)

OTHER PUBLICATIONS

Collins, Katie, "Leave digital gifts in physical locations with traces app", http://www.wired.co.uk/article/traces-messaging-app, Aug. 5, 2014, 11 pages.

(Continued)

*Primary Examiner* — Albert H Cutler
(74) *Attorney, Agent, or Firm* — Suiter Swantz pc llo

(57) ABSTRACT

An augmented reality moment file represented by an augmented reality icon recordable and readable by a handy having a processor in proximity to the locus of a recorded moment file configured to receive an augmented reality moment file. The content of the augmented reality moment file is preferably assessable via a user selectable icon either representative of a user, location, and/or theme. The icon assessable user created content moment file, in addition to content and a position, preferably also includes recorder identification, a recorded time, an expiration, and media such as text, an image, a video, a sound recording, a game play instruction, a game play move, and/or a setup menu.

15 Claims, 20 Drawing Sheets

Related U.S. Application Data

(60) Provisional application No. 62/352,433, filed on Jun. 20, 2016.

(51) Int. Cl.
*G06F 17/24* (2006.01)
*G06T 19/00* (2011.01)
*G06F 3/01* (2006.01)

(58) Field of Classification Search
CPC .......... H04N 5/23293; G06F 17/30817; G06F 3/011; G06F 17/241; G06F 3/04817; G06K 9/00684; G06K 9/00671; H04W 4/025; G06T 19/006; G06Q 30/0639; G06Q 30/08
See application file for complete search history.

(56) References Cited

U.S. PATENT DOCUMENTS

| | | | |
|---|---|---|---|
| 2015/0029180 A1* | 1/2015 | Komatsu | G06T 19/006 345/419 |
| 2015/0356063 A1* | 12/2015 | Jiang | G06F 17/30964 715/232 |
| 2016/0283595 A1* | 9/2016 | Folkens | G06F 3/013 |
| 2017/0132267 A1* | 5/2017 | Zhou | G06F 17/30345 |
| 2017/0193300 A1 | 7/2017 | Shatz | |
| 2017/0195554 A1* | 7/2017 | Shatz | H04N 5/23216 |
| 2017/0256097 A1* | 9/2017 | Finn | G06T 19/006 |

OTHER PUBLICATIONS

Jardin, Xeni, "Pip, new minimalist messaging app, promises easy update to friends", https://boingboing.net/2014/12/04/pip-new-minimalist-messaging.html, Dec. 4, 2014, 2 pages.

Knibbs, Kate, "Is this the first annonymous app that understands the power of secrets?", https://www.dailydot.com/debug/yik-yak-app/, Mar. 21, 2014, 4 pages.

Lawler, Ryan, "Whisper Confirms $36M in New Funding, Adds Related Posts, Categories, and Explore Feature to App", https://techcrunch.com/2014/05/19/whisper-v4, May 19, 2014, 2 pages.

Martellaro, John, "Spyglass for iOS: Powerful Navigational Instrument", https://www.macobserver.com/tmo/review/spyglass_for_ios_powerful_navigational_instruction, Jun. 27, 2011, 5 pages.

* cited by examiner

SYSTEM FOR CURATION, DISTRIBUTION AND DISPLAY OF LOCATION-DEPENDENT AUGMENTED REALITY CONTENT

CROSS-REFERENCE TO RELATED APPLICATIONS

The present application claims priority under 35 U.S.C. § 120 as a continuation-in-part of U.S. patent application Ser. No. 15/231,241 filed Aug. 8, 2016 which in turn claims priority under 35 U.S.C. § 119 to U.S. Provisional patent application 62/352,433, filed on Jun. 20, 2016. Said provisional application Ser. No. 15/231,241 and 62/352,433 are hereby incorporated herein by reference in its entirety.

TECHNICAL FIELD

The present invention is generally related to apparatus and systems for sending messages and more particularly to a system and apparatus for constructing and sharing an augmented interactive landscape or the like. The present invention provides Location Based Media (LBM or LoBaM) and provides Augmented Reality Location Based Media (AR-LBM).

SUMMARY OF THE INVENTION

The present disclosure teaches a device (e.g., a handy) allowing users to augment the environment with media files accessible and identified by an icon tagged to a particular location or object and accessible by users proximate to the tagged location (sometimes hereinafter "Location Based Media" or "(LBM)").

Individuals interact with their environment on a continual basis. Certain moments may occur where an interaction with a place, thing, person, article, thought, feeling, or the like may occur. Such moments, indeed all moments, are multi-dimensional and/or multisensory. Each moment, whether ignored or passed without notice, or contemplated, generally includes all the senses of a person, a time and date, a location, an orientation, and a set of things involved in the moment, e.g., a sound, a song, a video, some text, a conversation, a three-dimensional object, a place, a person, or group of people, a landscape, a view, or the like. Such moments produce thoughts and or feelings. Recording such moments for sharing and hermeneutics (context) for a particular set of circumstances is desirable. A moment may be a simple reminder or a multidimensional (multisensory) reminder (one which generates a mood or feeling) or for communicating the feelings attached to the context of experiencing a particular moment to a select group of friends, a filtered audience or broadcast unfiltered to complete strangers.

An augmented reality moment file which is represented by an augmented reality icon recordable and readable by a handy having a processor in proximity to the locus of a recorded moment file configured to receive an augmented reality moment file. The content of the augmented reality moment file is preferably a user selectable icon either representative of a user, location, and/or theme. The icon assessable user created content moment file, in addition to content and a position, preferably also includes recorder identification, a recorded time, an expiration, and media such as text, an image, a video, a sound recording, a game play instruction, a game play move, navigation instructions, geocache instructions, and/or a setup menu.

In one embodiment of the present invention a recording of a moment may be shared with a party that has moved near or to the location from which a particular moment (encounter) was recorded (placed). Likewise, a time, thing, person, object or position may recall a recorded moment to another. In operation, an enrolled handy or the like (smart device, iPhone, iPad, tablet, Android device, Surface, optical head mounted display or eyewear, or other portable electronic device) may be utilized to record and read/view/experience a moment.

A person carrying an enrolled handy or the like while traveling, eating, walking, working, driving (passenger), traveling, and otherwise living may record the embodied experiences of a moment (or interaction) with a video, song, menu, image, video, conversation, story, interactive moment element, or the like, tagged to a particular location, orientation, and time. Interesting (suitable/desired) moment files may be located via both tangible and intangible aspects of a recorded moment (experienced/shared) by an in situ user by location, tagged object, and the like. Additionally, the context of a recorded moment may be searchable by time, location, orientation, type, mood (humorous, informative, poignant, opinion, historical, idiohistoric, and others) and filtered by an in situ user (or remote users in special embodiments of the present invention).

When necessary measurements by an inertial measurement unit (IMU) of an enrolled handy may be utilized to determine a location and orientation of the enrolled handy. In this manner a moment may be recorded/read either with or without the presence of an externally transmitted positioning signal. The system capable of identifying a location and orientation of a portable user handy may map user moments to a virtual property ownership system where use of the system may be monetized.

In a presently preferred embodiment, the invention may work and employ virtual and augmented reality standards as they develop and are deployed such that objects/things and the like may be paired with a tagged location (message) and orientation of an enrolled handy.

BRIEF DESCRIPTION OF THE DRAWINGS

The numerous objects and advantages of the present invention may be better understood by those skilled in the art by reference to the accompanying figures in which:

FIG. 11 is an environmental diagram of an embodiment of the present invention utilized in a museum or the like;

FIG. 12 is an environmental diagram of an embodiment of the present invention utilized in a retail store or the like;

DETAILED DESCRIPTION OF THE INVENTION

Figure 1:
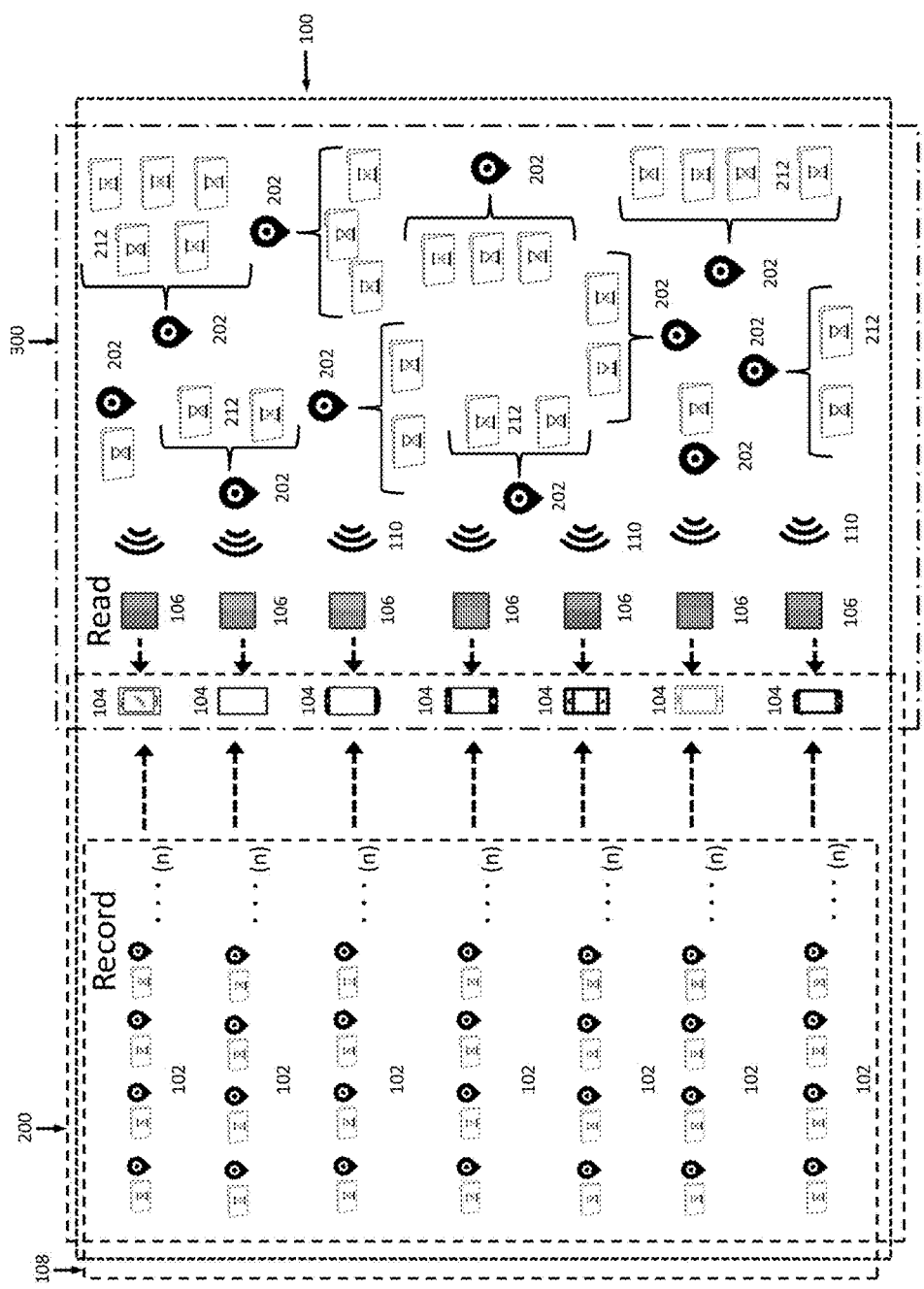
FIG. 1 is a highly diagrammatic environmental view of the moment recorder and reader network of an embodiment of the present invention.

Reference will now be made in detail to exemplary embodiments of the disclosure, examples of which are illustrated in the accompanying drawings.

The instant disclosure describes an apparatus, method, and system for recording moments 10 via a moment system 100. The moment system 100 includes a plurality of moment recorders 200 for recording moment files 102 to a server 108 (or the like). Each moment file 102 may include media 212 tagged with a location 202, a time 204, and an orientation 205 of an enrolled handy 104. An embodiment of the moment 10 may also include a locomotive source 208 and theme 210.

Moment files 102 are associated with a location 202 (e.g., object 122 or place 206), a time 204, and an orientation 205 of an enrolled handy 104. Users 12 may tag objects 122 and places 206 to leave media 212 and the like for other users 12. The present invention allows users to filter, follow, share, inform, opine, and exchange ideas and moments 10 interesting to themselves and others. It is noted that moments 10 may be filterably selected in a variety of ways including being selected from at least one of a class, a category, and a theme of moments.

Turning first to FIG. 1, a plurality of enrolled handys 104 (or the like) may be networked 110 in an embodiment of the present invention for recording 200 and reading 300 moments 10 by subscribed users 12 using enrolled handys 104. Moments 10 are recorded 200 in a file 102 (on a server 108 or the like) tagged to a location 202 (object 122, place 206 or the like) and includes a time 204 (date, time of day), orientation 205 (a pitch, a yaw, and a roll) of an enrolled handy 104 that records the moment 10, and identification information for the user recording the moment. Each moment 10 is created via an enrolled handy 104 or the like by directing the enrolled handy 104 to a place 206 (object 122, location 202) to record the coordinates of the location 206, the time 204, and orientation 205 of the enrolled handy 104. A user 12 may then associate the moment 10 and the tagged location and orientation coordinate set with media 212. Moments 10 may additionally include tokens, games, instructions, memories, memorabilia, advertisements, and the like.

Each enrolled handy 104 may include a camera, a speaker, a display, a position and orientation identification system, a memory, a wireless connection to a server, a text input, a sound input, a global navigation satellite system (GNSS) receiver, and an inertial measurement unit (IMU). It is noted that the display allows a user 12 to display a field of view of the camera, display content, and display content context.

Each enrolled handy 104 may include a user selectable icon for selectably reading and recording an augmented reality moment file 102 positioned in an orientation 205 and location 202 as at least one of a tagged object and a location 202 viewable within the display of the handy 104 when the handy 104 is oriented and located in the locus and orientation 205 of said augmented reality moment file 102. In one embodiment, the locus is a circle centered on a location 202 of a moment 10. For example, a user 12 may define the radius of a locus circle centered on the location 202 of a moment 10.

Figure 2:
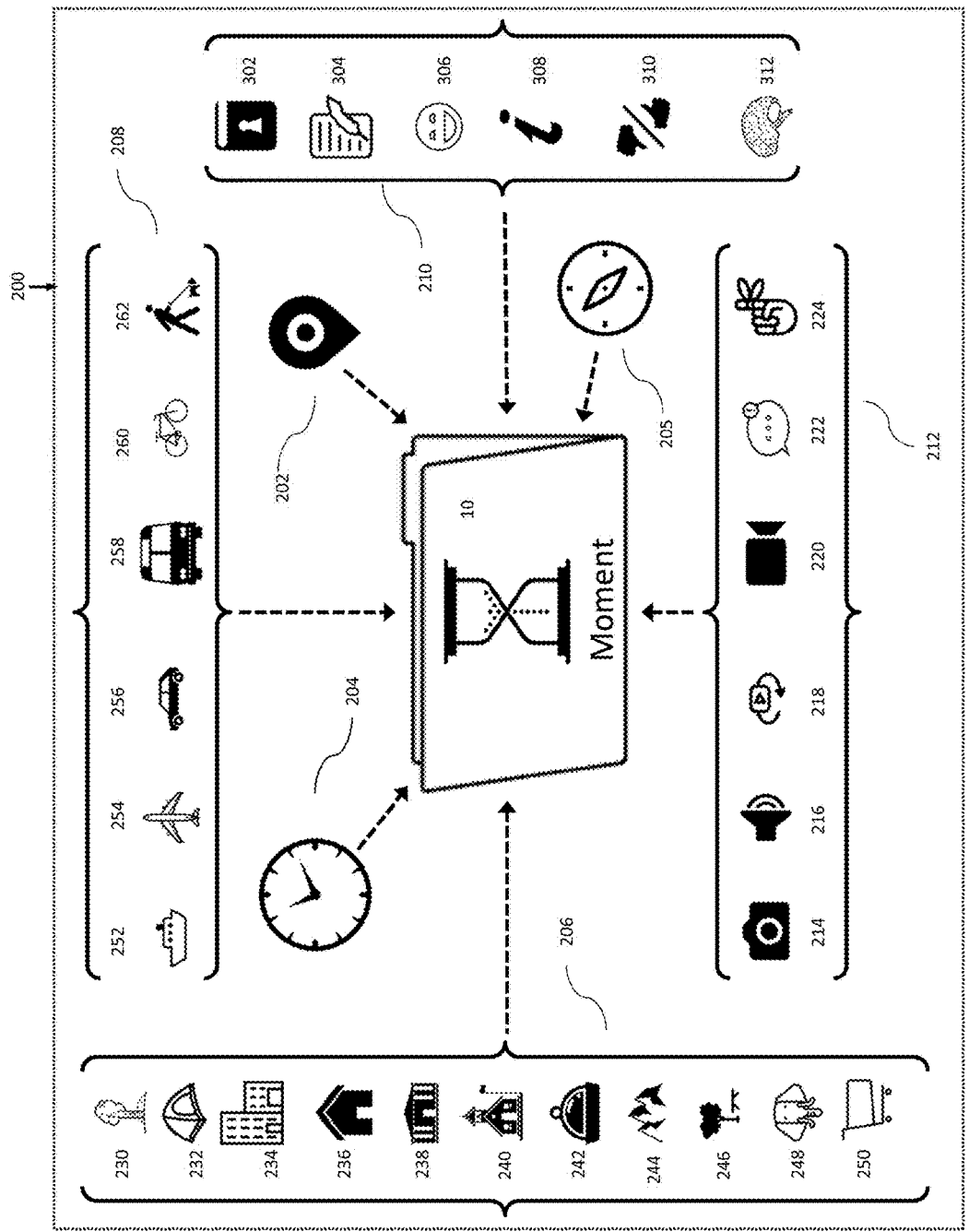
FIG. 2 is an environmental diagram illustrating an embodiment of a recording apparatus of the present invention.
Figure 18:
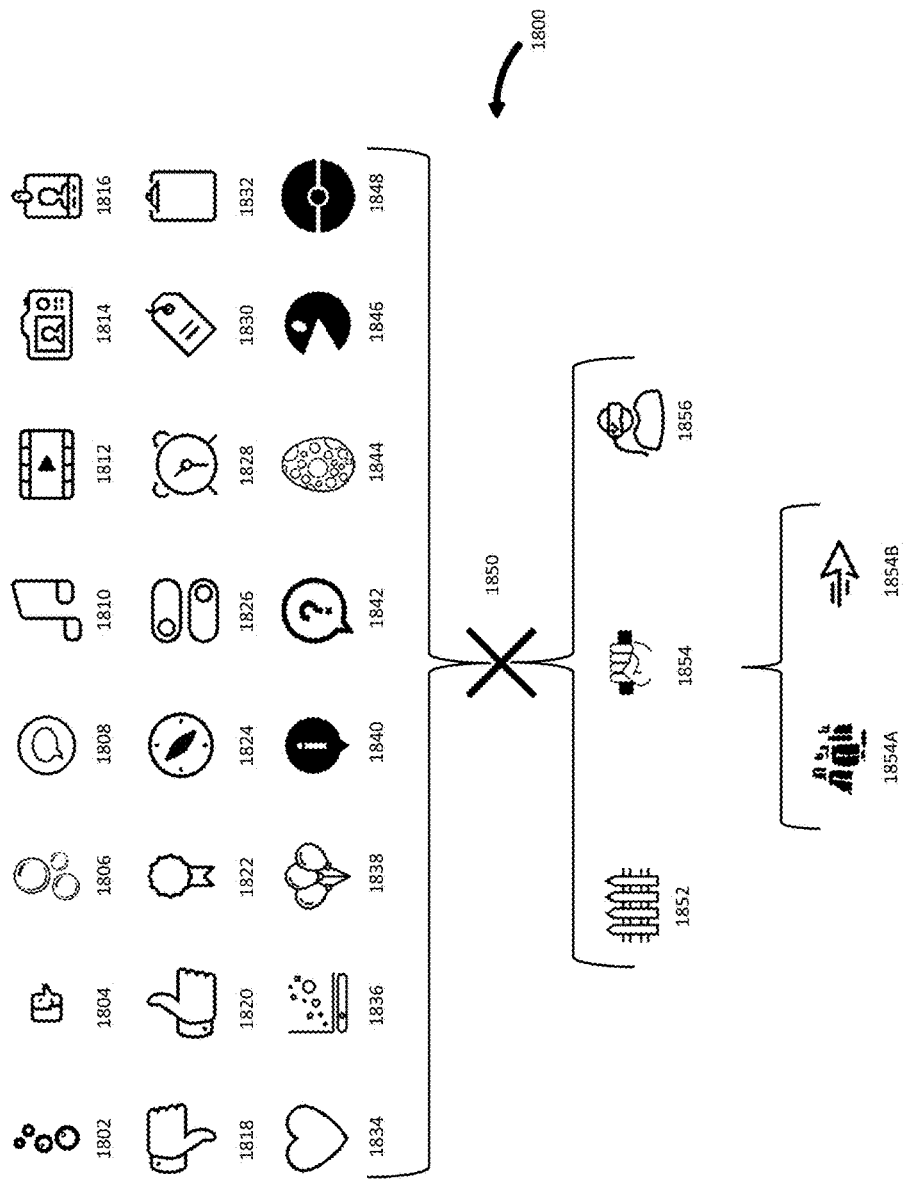
FIG. 18 is a highly diagrammatic illustration of a multi-dimensional moment file reader/recorder system capable of operation in both real, virtual, and augmented states where moment files may be categorized, accessed, and appended to real, augmented, and virtual objects.

FIG. 2 illustrates an embodiment of the system 100 of a moment recording system and apparatus 200 of the present invention. When activated, the moment recorder 200 records a location 206, or a series of locations in seriatim, for a moment 10 (or a series of moments) in, for example, a geographic coordinate system geodetic datum (WGS 84 or the like). The moment recorder 200 also records the date and time 204 for each location 206, and the orientation 205 of the enrolled handy 104 that recorded the moment 10 in a moment file 102. Included in the moment file 102 are additional classes of information (206, 210, 212, & 208) for providing multiple-dimensional-information 200 tagged and associated with and about a moment 10 (FIG. 18). For example, where the moment 10 was recorded while traversing a location in some means of transportation (also called locomotive source) 208 such as a ship 252, airplane 254, automobile 256, public transportation 258, bicycle 260, or while ambulating 262, the method of transport is preferably associated with the moment 10. Likewise, where the moment takes place in an area 206, e.g., a national park 230, on a road 604 or sidewalk (trail 602), a campground 232, building 234, house 236, museum 238, school 240, restaurant 242, scenic area 244, city park 246, zoo 248, store 250, or the like, such information will be recorded 200 in the moment file 102.

The locomotive source 208 may be determined by the position and orientation identification system based on direction and velocity measurements. In some embodiments, the position and orientation identification system determines the locomotive source 208 based on location as well as direction and velocity measurements. A user 12 may alternatively record in the system a locomotive source 208.

The location of a moment may be determined by the system based on location (coordinate) measurements, a user may record in the system a location, or the system may utilize the position and orientation identification system to determine location.

In a preferred embodiment of the recorder 200, media may also be associated (tagged) to a moment 10. For example, a picture 214, a sound or audio recording 216, a 360° video 218 or video 220, a text 222 or an image, a screen shot, a calendar entry, reminder 224, or the like. Also preferably associated with the moment 10 is context 210, or mood, or the like 108. For example, an embodiment may also record as part of a moment 10 a diary entry 302, a history 304, a feeling or mood 306, information 308, an opinion 310, or poignant anecdotes 312 or the like.

In another embodiment, a moment 10 may include an expiration code, a game play instruction, a game play more, or a setup menu.

Figure 3:
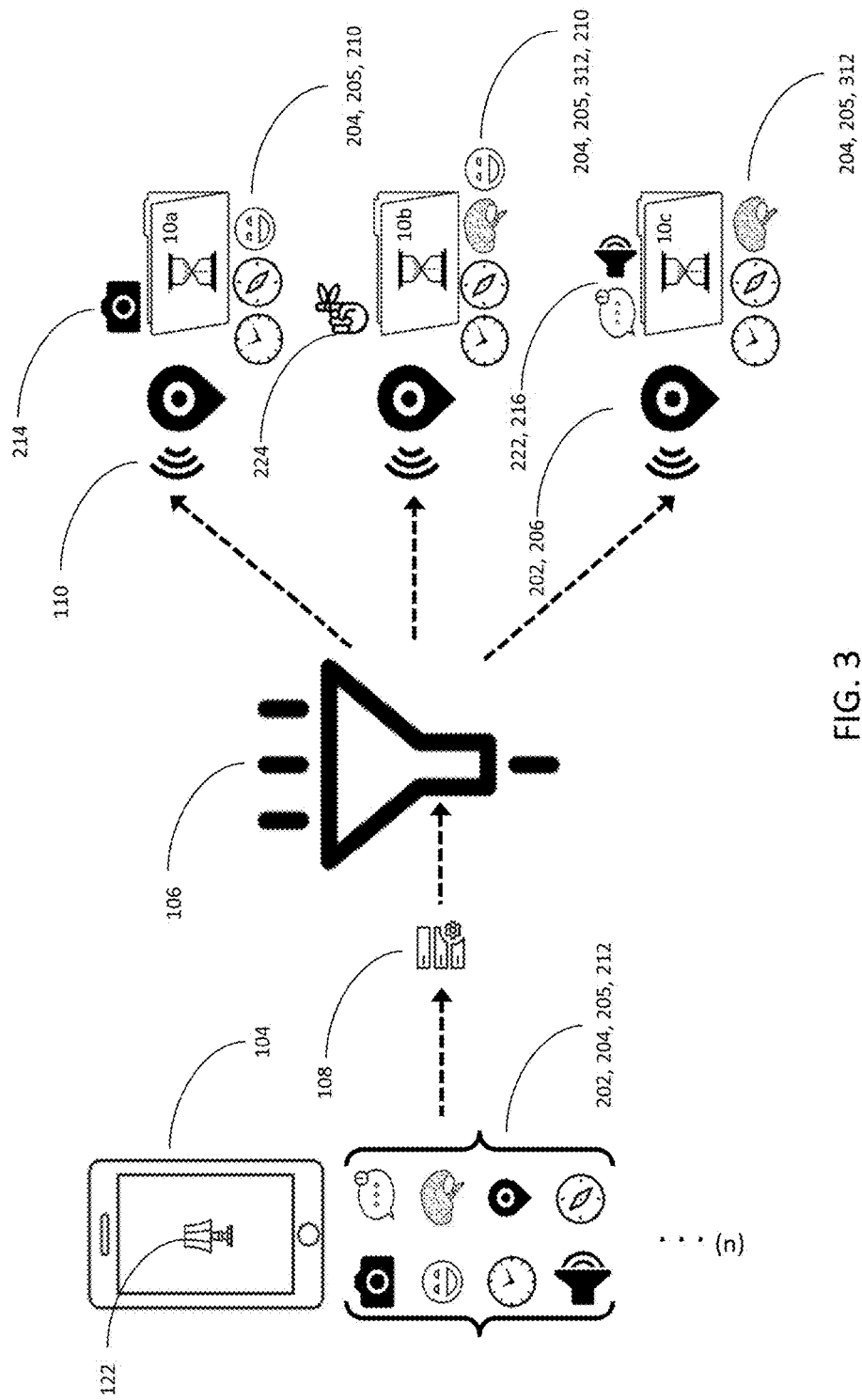
FIG. 3 is an environmental diagram illustrating an embodiment of a reader apparatus and associated presently preferred moment selection and filtration means of an embodiment of the present invention.

FIG. 3 illustrates a presently preferred method and apparatus for reading a tagged moment 10 (from a location 206 or the like). An enrolled handy 104 (camera) may be directed to, near, or toward an object 122 (e.g., a table lamp). A user 12 may then use the present invention 100 to tag the object and add content (206, 208, 210, 212) to be written with and associated with the object (and its location, time, and orientation of an enrolled handy) to a moment file 102. The moment file 102 is, in a presently preferred embodiment, written to a server 108, via a network connection 110 or the like (the file may be restricted to a particular user 12 or user group). The moment file 102 may be stored and searched by an in situ user (and in some embodiments also a remote user) location and at least one of a media 212, a locomotive source 208, a location 206, an orientation 205 of an enrolled handy, and a theme 210. Another user 12 with an enrolled handy 104 or the like may utilize a filter 106 or the like to restrict availability or reviewability of a moment file 102 in accordance with user selectable traits or preferences. Thus, a user 12 might select to have available moments 10 by location 206, enrolled handy orientation 205, and/or context. For example, a particular mood 306 or feeling 312, a type of object 122, a location 206, enrolled handy orientation 205, and/or media type 212. As a user 12 encounters an object the person may orient 205 their handy 104 at an object 122, at a location 206, at a set of coordinates to review available (readable) moments 10.

FIG. 3, by way of example, illustrates three moment files 10a, 10b, and 10c. Moment 10a contains a photograph and describes a mood 306 (and time 204, and enrolled handy orientation 205). Moment 10b contains a reminder 224, a time 204, an enrolled handy orientation, a feeling 312, and a mood. Moment 10c contains a text 222 (description), a sound recording (song) 216, a time 204, an enrolled handy orientation 205, and a feeling 312. All of the example moments (10a-c) may be associated with a single object 122 (lamp) at a particular location (e.g., a hotel lobby or the like), with an enrolled handy 104 oriented 205 in a similar direction, each created by different users 12, at different times 204, and readable 300 by one or more users 12.

A server 108 may contain an individual server, a universal server, a group server, and/or multiple servers providing connectivity to users 12 recording 200 and reading 300 via a network connection 110. The system 100 may provide users 12 access via a network connection 110 connected to a server 108 via a filter 106 (user selectable and controllable via, for e.g., an application driven menu or the like) associated with a reader 300 (enrolled handy 104).

Figure 4:
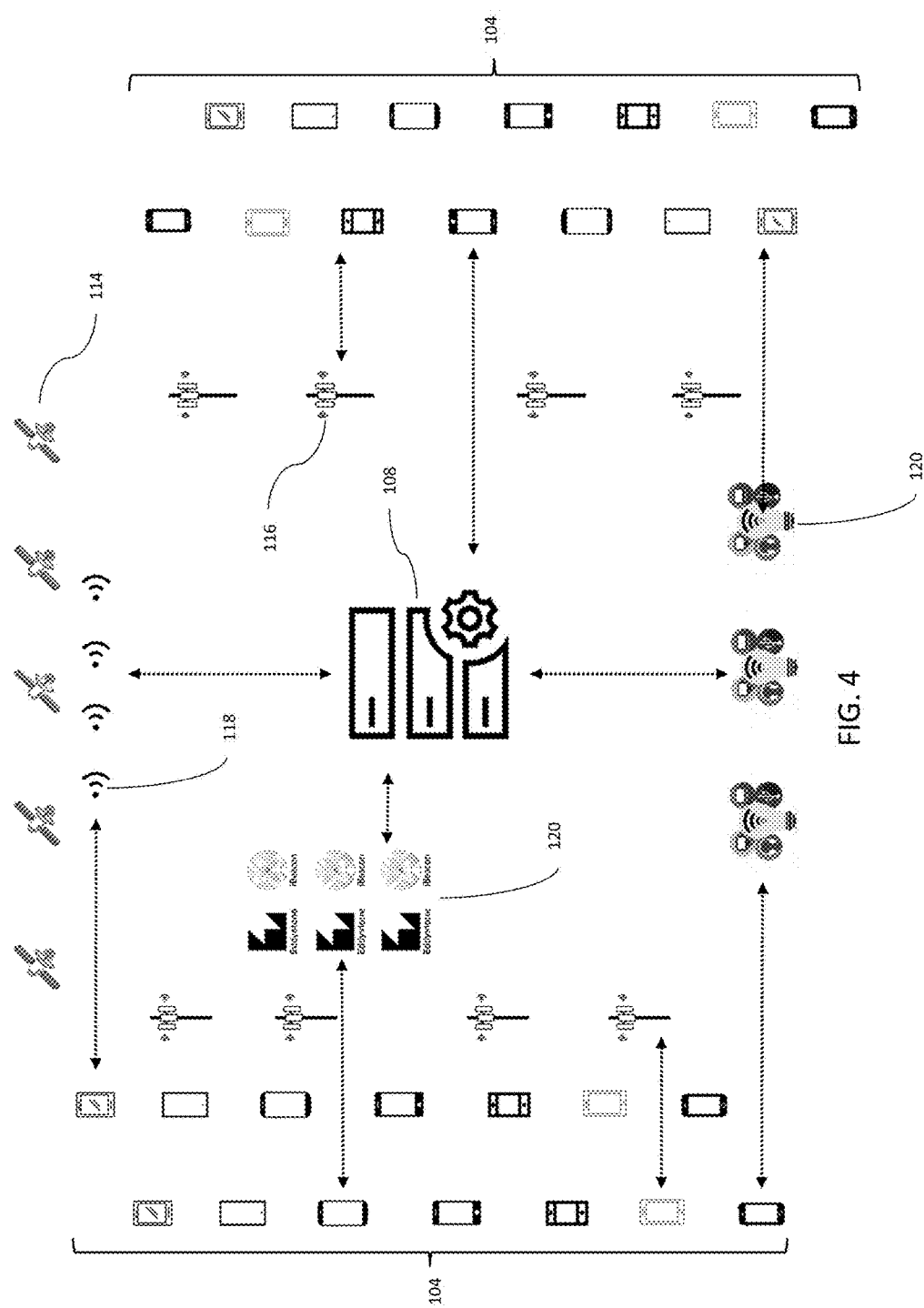
FIG. 4 is a highly schematic diagram of a location determination module (positioning sensors) of an embodiment of the present invention.

FIG. 4 illustrates a presently preferred network connection 110 schema for allowing recorders 200 and readers 300 of the system 100 to operatively connect with the system to record 200 and read 300 moment files 102. Preferably the system 100 may be utilized both in and out of doors. By way of illustration a plurality of handys 104 may be connected to a server 108 via a cellular network 116 (when available) and have consistent and reliable location information 114 via a GNSS system or the like. When a cellular connection 116 is unavailable, WiFi or Bluetooth 118 may be utilized to provide both connectivity 110 and user 12 location information 114 (triangulation, multilateration, or the like). LiFi 120 and other indoor location and connectivity systems may also be utilized (Eddystone, iBeacon) to provide robust system 100 connectivity 110 for both recording 200 and reading 300.

Figure 5:
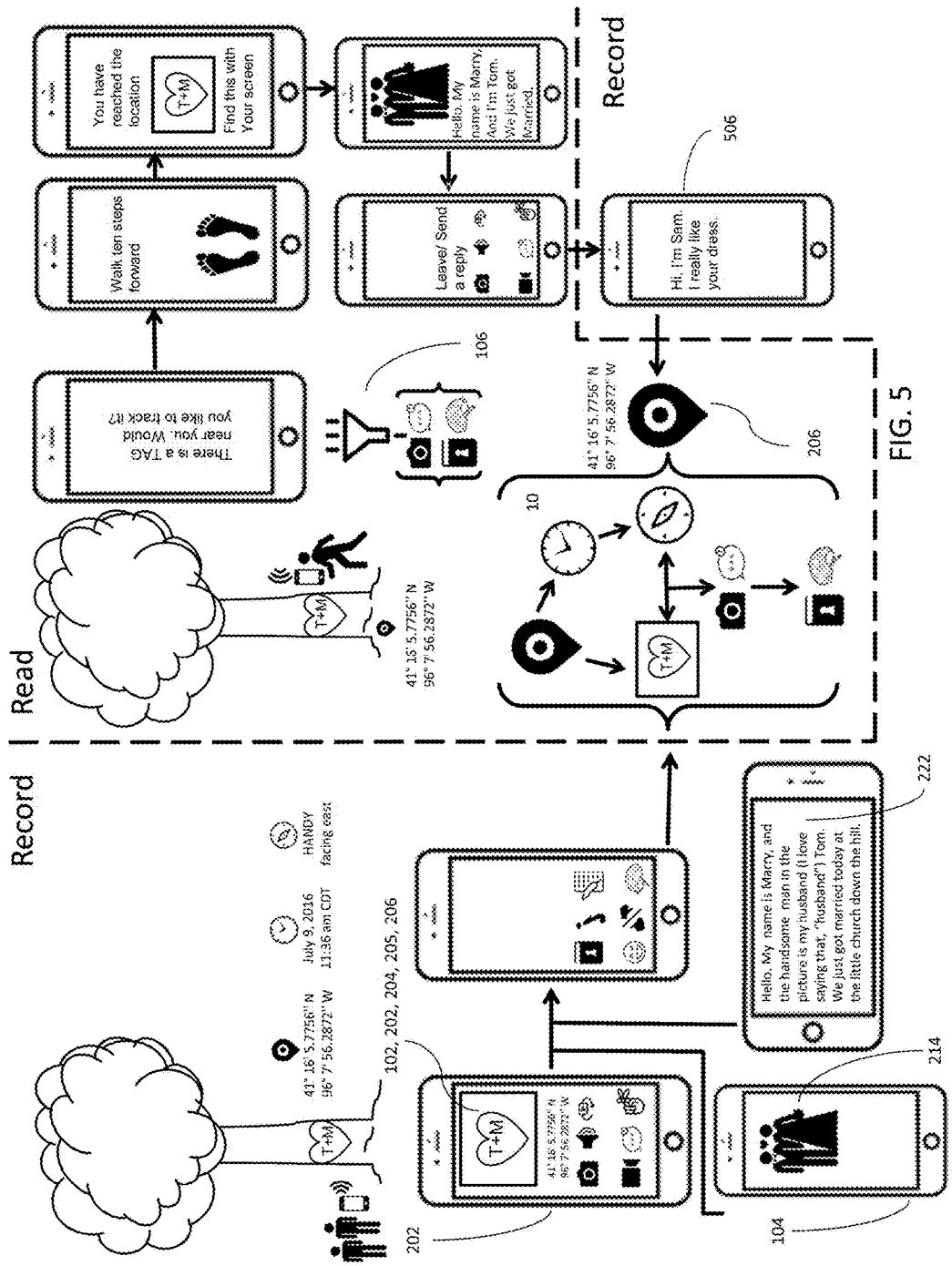
FIG. 5 is an environmental diagram of an embodiment of an example of a moment location tagging aspect of an embodiment of the present invention.

FIG. 5 illustrates a presently preferred means of utilizing an embodiment of the present invention. Users 12 may record 200 a heart and initials virtually or actually carved into a tree. The object (carving) may then be associated with their initials (and other media) virtually into a tree. Users 12 may decide to capture the moment using aspects of the present invention 100. Using handys 104, a user 12 may tag a particular location (longitude and latitude) of the tree, a reference object (i.e., heart carving), orientation 205 of an enrolled handy recording the moment, and a time 204 of the tag. Users may then select to leave a picture 214 and a text 222 in the moment file 102 attached with the paired location-object (tree-heart). Selecting a message type may also be provided, e.g., a feeling 312 and/or diary 302. After the passing of time another user 12 in the vicinity of the tagged location (tree) with appropriate filter settings (appropriately selected filter preferences or viewing authorization) may be alerted of a nearby moment 10. The moment 10 may be investigated or ignored. If the moment 10 is to be read, shared, an embodiment may tell a user 12 how many of their steps (and in what direction) the recorded moment 10 resides. Upon following a set of instructions and properly orienting 205 an enrolled handy 104 toward a tagged object a moment 10 may be read 300. This and subsequent users 12 may comment on the original and subsequent moment with a new moment 506. A different media may be utilized, and a reply may be sent to the original recording enrolled handy 104. It is noted that an enrolled handy 104 must be proximate the location 202 of a recorded moment 10 and oriented 205 toward the location 202 of the recorded moment 10 in order to read 300 the moment file 102.

Figure 6:
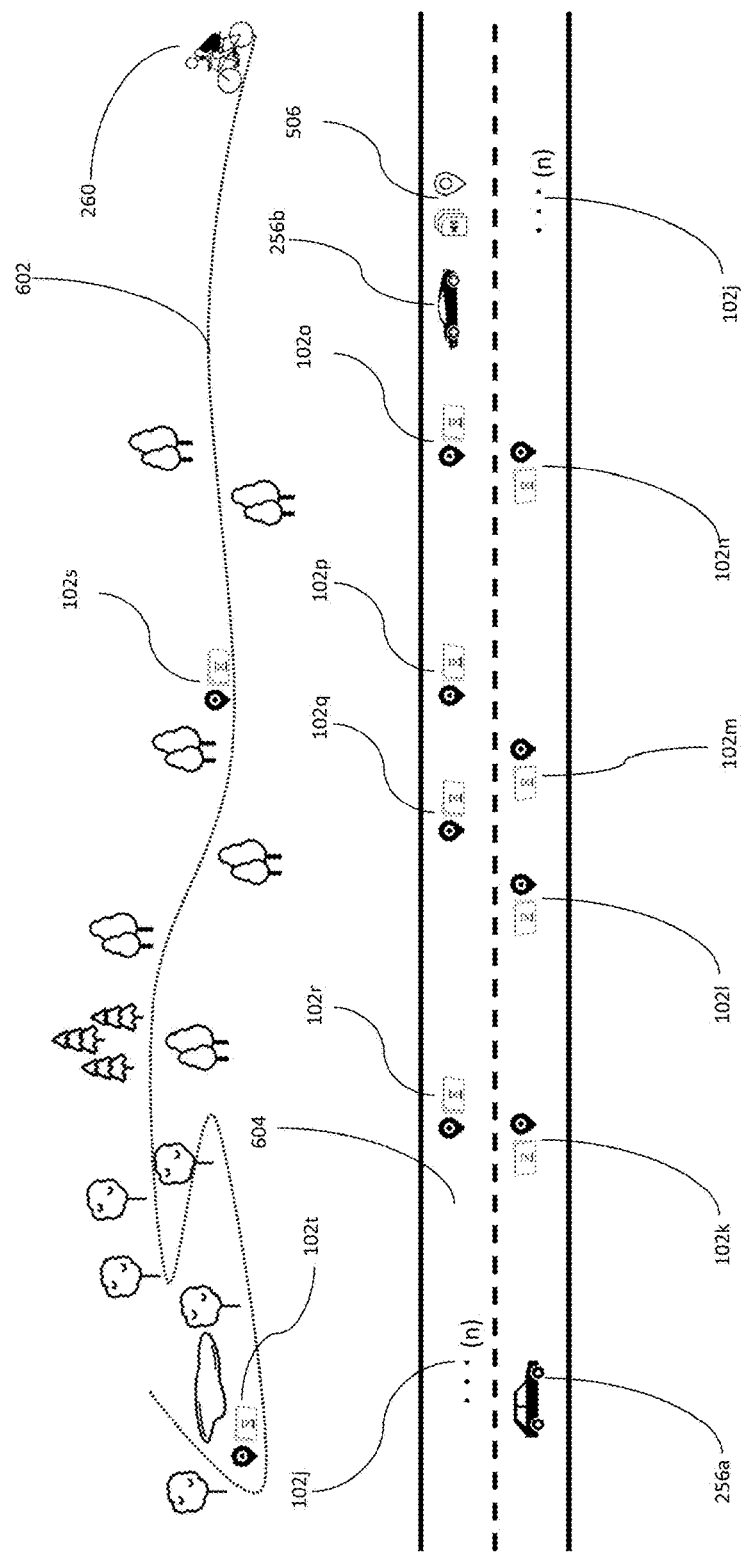
FIG. 6 is an environmental diagram illustrating an embodiment of a locomotion-based embodiment of an aspect of the present invention.

FIG. 6 illustrates an embodiment of the system 100 for utilization while moving 208. In operation a user 12 may leave a string of moments 102k-102t along a travel way 602, 604. It is noted that a user may leave a string of any number of moments 102j. A user 12 in a vehicle (or walking 262) may both record and read moment files 102 along the path. For example, a plurality of photographs 214 (album covers) and songs 216 might be left as a playlist for reading (watching/listening) by a user traveling (in a vehicle 256, bicycle 260 or the like). Member users 12 and the like may subscribe to a single or various recorders 102j for listening and viewing the travels and travel interests of a person (recorder) they follow via their filter 106 (blogger/disk jockey). Likewise a plurality of photographs 214 or video snippets may be left showing scenic areas along a route during different seasons or conditions. Additionally, a recorder may record commentary or opinions as in a travelogue or the like. Member users following a particular author (travel writer/blogger) may obtain a more complete and fulfilling travel experience. Furthermore, children and the like may experience the commentary of past travel (e.g., a travelogue) recorded moments 10 of a parent (family member or friend) along a particular route. Moment archeologist of the system 100 may track, write histories, study, promote policies, predict future interest, and the like.

Figure 7:
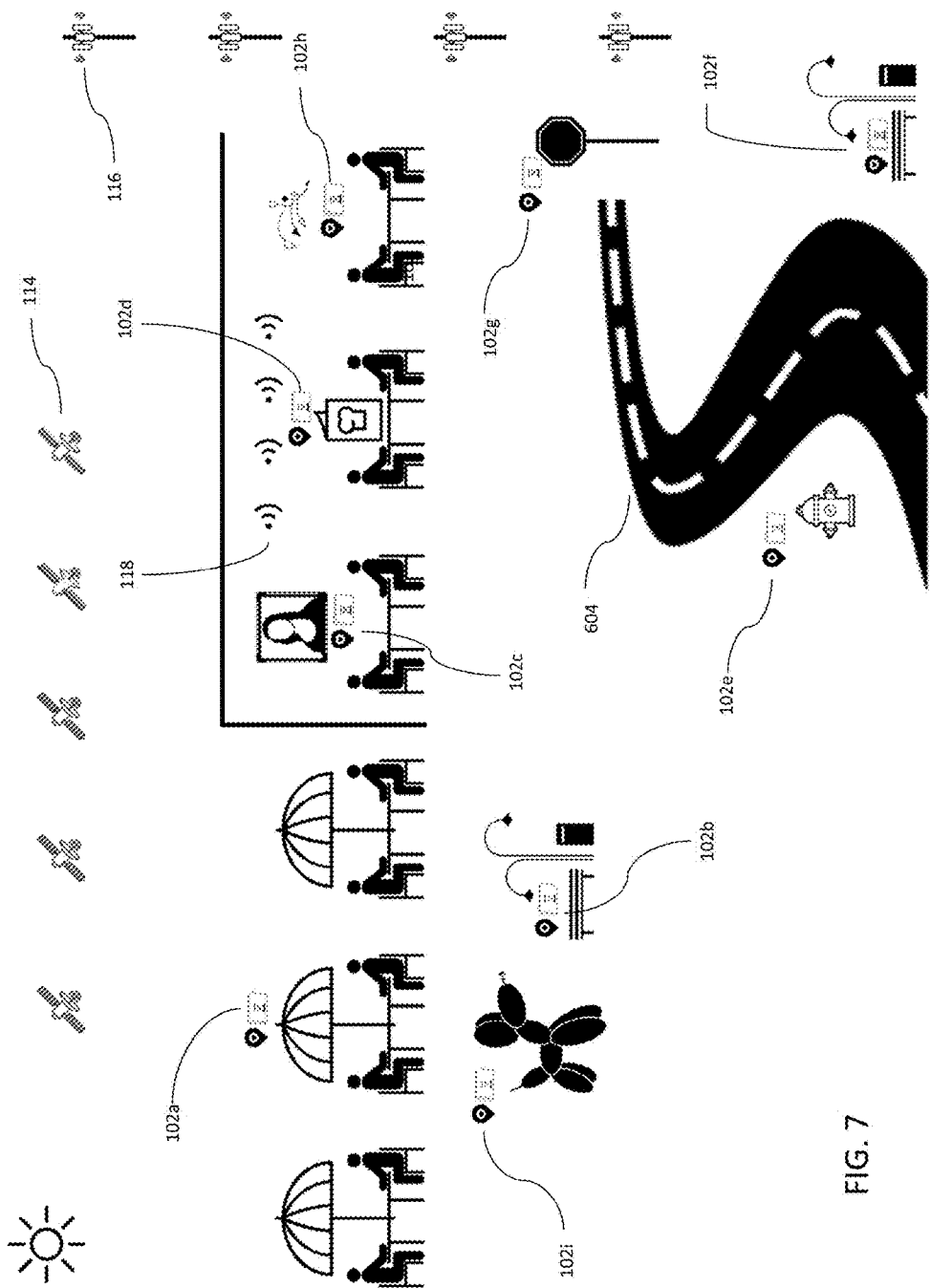
FIG. 7 is an environmental diagram of various aspects of an exterior and interior utilization of an embodiment of the present invention.

Turning now to FIG. 7, a moment 102a may be recorded at an outdoor table at a restaurant or café memorializing a moment via a particular medium or collection of media such that another user 12 may experience or enjoy a particular aspect saved 200 by another user 12. In an indoor table a user 12 might read 200 (or record 300) a moment 10 regarding an object such as a painting 102c. The user's 12 enrolled handy 104 (or the like) may provide location 202, orientation 205 and connectivity via a wireless network 118. Additionally, a user 12 may opine 310 regarding a menu item 102d or menu, or meal, or the like. Information 308 regarding a particular locus in quo may also be shared via an embodiment of the system 100 of the present invention. Some locations including interesting objects, such as a sculpture, thing, or the like 102h, which may warrant a comment or moment 10 of interest to other users 12. Outdoor venues may also include objects to be tagged with a moment 10 such as an outdoor sculpture 102i, bench 102b, hydrant 102e, bus stop 102f, sign 102g, or the like. Location data may be derived via a GNSS network 114 or wireless network 118, or the like.

Figure 8:
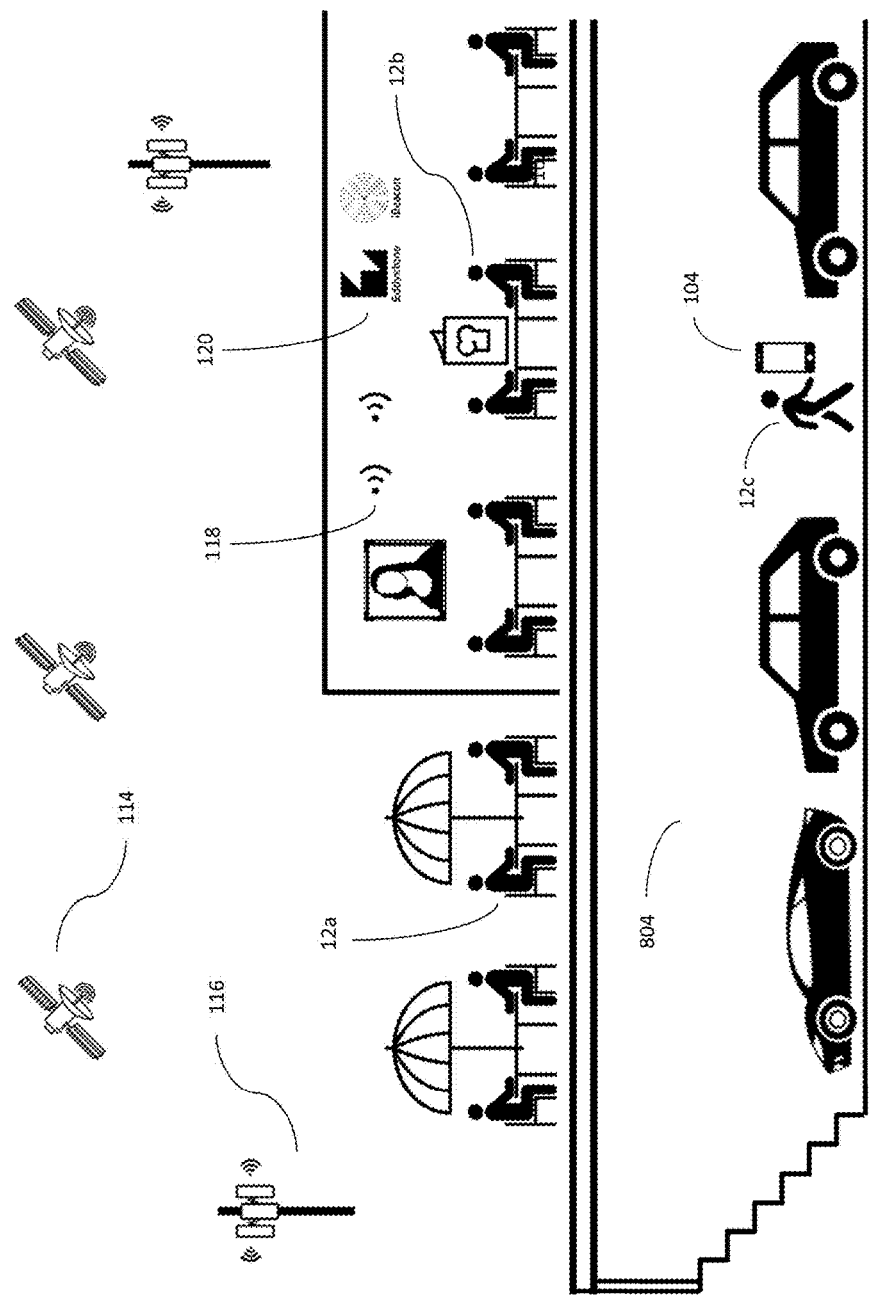
FIG. 8 is an environmental diagram of various aspects of obtaining location information of an embodiment of the present invention.

FIG. 8 illustrates, by example, the utilization of an embodiment of the present invention 100 in various places where different methods of obtaining location information 114 may be employed. Location information 114 may be obtained from a cellular network 116 via a GNSS system, a WiFi or Bluetooth 118 connection, a LiFi 120 connection, or an enrolled handy 104 position and orientation identification system. For example, a user 12a located in an outdoor venue may obtain from a cellular network 116 location information 114 via a GNSS system or the like. By way of another example, a user 12b located in a building may obtain location information 114 from a WiFi or Bluetooth 118 connection or a LiFi 120 connection. It is noted that a user 12b may not have a cellular network 116 signal within a building or the signal may be diminished and a WiFi or Bluetooth connection is the only communication method of obtaining location information 114.

It is noted that in various situations not all methods of obtaining location information 114 will be available to a user 12. In some situations the strength of an externally transmitted positioning signal may be diminished, intermittent or absent in a particular location where a user is located with an enrolled handy 104. For example, a global navigation satellite system (GNSS) such as the global positioning system (GPS) may provide a diminished signal to an enrolled handy 104 of a user 12c located in an underground parking garage 804 and thereby prevent the enrolled handy 104 from receiving location information 114. In situations where location information 114 can not be obtained by an enrolled handy 104 via an externally transmitted positioning signal or internal spatial position and orientation identification system operating on an enrolled handy 104 may provide location information 114. For example, in the absence of an externally transmitted signal for positioning an enrolled handy 104 may determine its location 206 and orientation 205 utilizing one or more measurements of the instruments contained in an IMU of the enrolled handy 104 and a point of origin. It is further noted that in some situations the only method of obtaining location information 114 may be by way of a position and orientation identification system operating on an enrolled handy 104 of the user.

Figure 9:
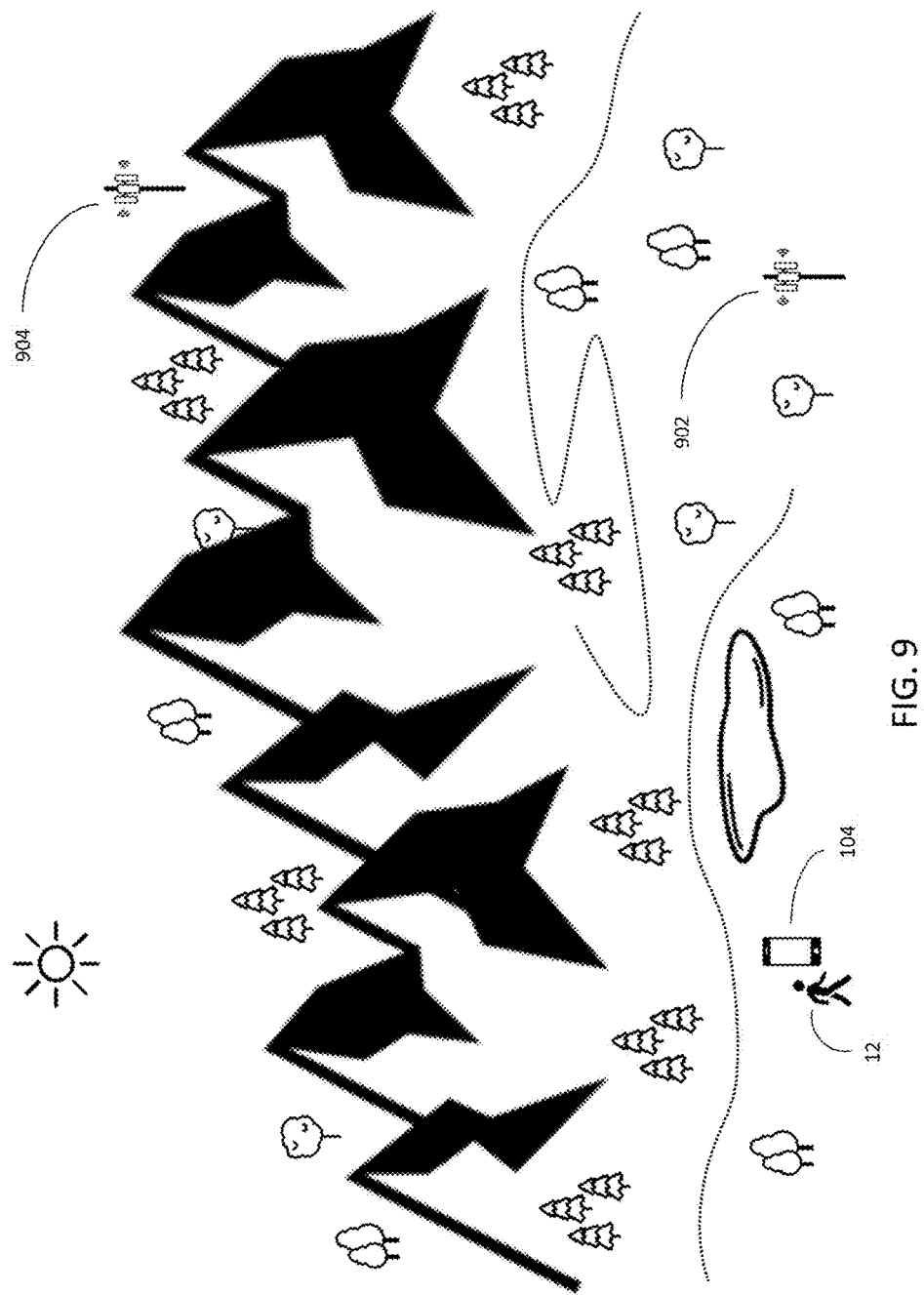
FIG. 9 is an environmental diagram of various aspects of determining location of an embodiment of the present invention.

FIG. 9 illustrates, by example, the utilization of an embodiment of the present invention 100 where a position and orientation identification system operating on an enrolled handy 104 is used to determine location. For example, an enrolled handy 104 operated by a user 12 in a remote location may be unable to perform multilateration of radio signals from two towers if only one tower 902 is in proximity of the enrolled handy 104 or if the radio signals received from two cellular network towers 902, 904 are too weak.

By way of another example, when traveling in a subway an externally transmitted positioning signal may be intermittent and connection may be made and lost a number of times during the course of travel.

In situations where an externally transmitted positioning signal is diminished, intermittent, or absent the system may utilize instruments integrated into the enrolled handy 104 to determine location. For example, the system may calculate the location of the user utilizing measurements from a magnetometer, an accelerometer, a gyro sensor, or a gyroscope. An orientation of an enrolled handy 104 may be determined by a magnetometer. A direction of movement by a user 12 may be determined by an accelerometer. A change in a direction of movement of a user 12 may be determined by a gyro sensor or gyroscope. Based on a particular situation a magnetometer, an accelerometer and a gyro sensor or gyroscope may function independently or collaboratively to determine a location and orientation of a user 12 that is experiencing a disruption in or absence of an externally transmitted positioning signal. The position and orientation identification system may determine a location that includes a longitude, a latitude and an elevation; as well as an orientation of the enrolled handy 104 that includes a pitch, a yaw, and a roll.

In the absence of an externally transmitted signal for positioning an enrolled handy 104 may determine its location 206 and orientation 205 utilizing one or more measurements of the instruments contained in an IMU of the enrolled handy 104 and at least one of a point of origin, a destination or a waypoint along a journey. For example, in the absence of an externally transmitted signal for positioning an enrolled handy 104 may determine a course traveled and orientation 205 utilizing one or more measurements of the instruments contained in an IMU of the enrolled handy 104 once travel is complete and a destination is recorded by a user 12. At times an externally transmitted signal for positioning may be present when travel begins and therefore the point of origin is known by the system. In other situations a user 12 records a point of origin in the system before travel begins. In these situations the system will track the location and orientation of the enrolled handy 104 during travel by recording the change in location and orientation of the enrolled handy 104 during the course of travel.

When an intermittent externally transmitted positioning signal is present an enrolled handy 104 may utilize one or more measurements of the instruments contained in an IMU of the enrolled handy 104 to determine a location 206 and an orientation 205 of the enrolled handy 104 utilizing the last known location of the enrolled handy 104 as a point of origin. For example, in situations where an intermittent externally transmitted position signal exists the position and orientation identification system may treat each loss of signal as an absence of an externally transmitted position signal and begin tracking location 206 and orientation 205 of the enrolled handy 104 until the externally transmitted positioning signal is acquired again and a location 206 and an orientation 205 of the enrolled handy 104 may be verified by location information 114.

In some circumstances a user 12 may record in the system a locomotive source, a point of origin, or a destination. In a situation where an externally transmitted positioning signal is diminished, intermittent or lost the system may determine the progress of a journey and thereby a location of a user 12 until the externally transmitted positioning signal is again received if a point of origin and destination have been recorded in the system. In this way moments may be recorded while a user 12 travels and has a disruption in an externally transmitted positioning signal. Additionally by determining the location of a user 12 while the user is traveling a moment 10 may be viewed when the user becomes proximate to and oriented toward the location of a recorded moment 10.

Figure 10:
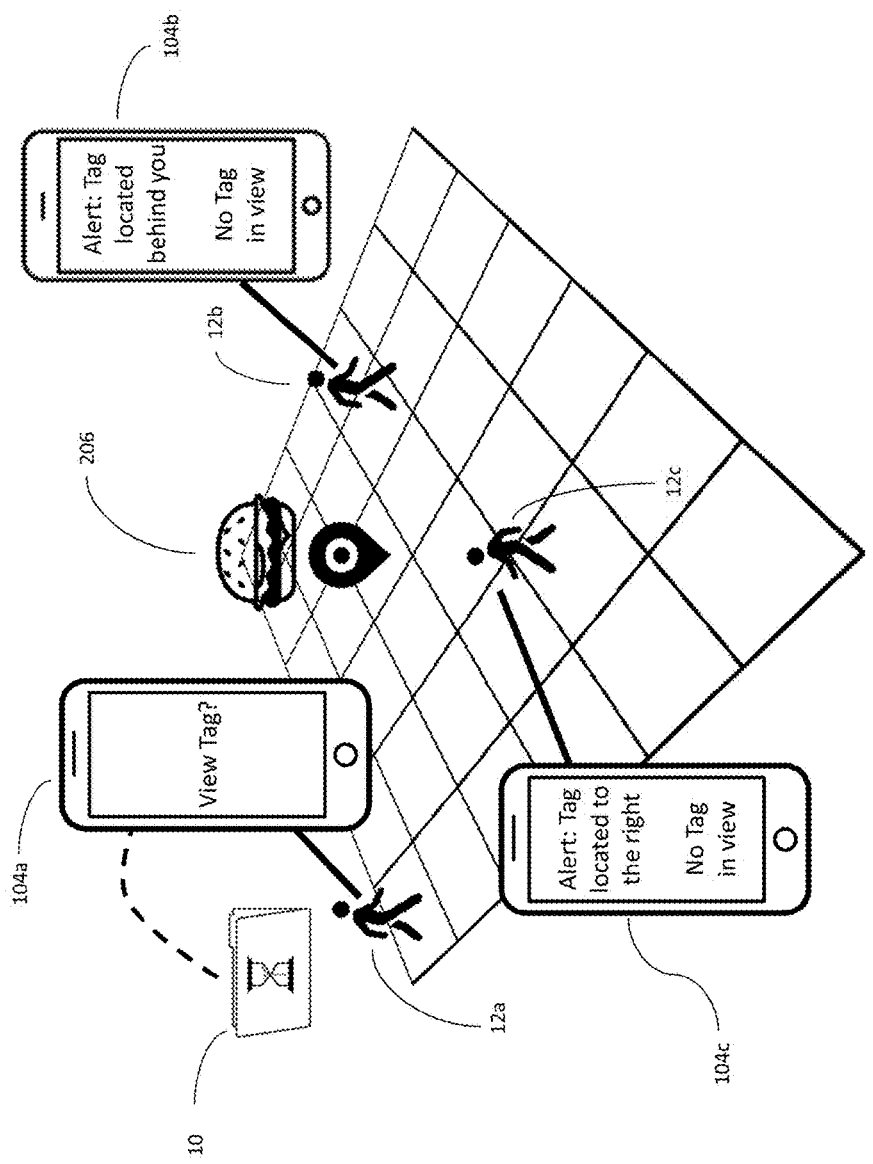
FIG. 10 is an environmental diagram illustrating the utilization of location and orientation to identify and locate a moment of an embodiment of the present invention.

FIG. 10 illustrates, by example, an embodiment of the system 100 utilizing location and orientation of an enrolled handy 104 to identify and locate viewable moments 10. For example, a moment 10 tagged to a location 206 may be viewable if an enrolled handy 104 is both proximate and oriented 205 toward a tagged location. For instance, a user 12a proximate and facing a location 206 tagged with a moment 10 may be alerted by an enrolled handy 104a of the existence of a viewable moment 10. It is noted that the user 12a is alerted of the existence of a moment 10 that has been tagged to a location 206 because the user 12 has an enrolled handy 104a proximate the location 206. It is further noted that a tagged moment 10 is viewable only once an enrolled handy 104a is both proximate and oriented 205 toward the location 206 of the tagged moment 10. A user 12b that is proximate a tagged location 206 and has an enrolled handy 104b oriented 205 away from a location 206 may be alerted of a tagged moment 10 nearby. A user 12b may choose to follow instructions to locate the moment 10 or ignore the alert. Once an enrolled handy 104b is oriented 205 toward the location 206 the moment 10 is viewable and may be read 300. Likewise a user 12c that is passing by and proximate a tagged location 206 may be alerted by an enrolled handy 104c of a nearby tagged moment 10. A user 12c may choose to follow instructions to locate the moment 10 or ignore the alert. Once the enrolled handy 104c is proximate and oriented 205 toward the location 206 the tagged moment 10 is viewable and may be read 300.

Figure 11:
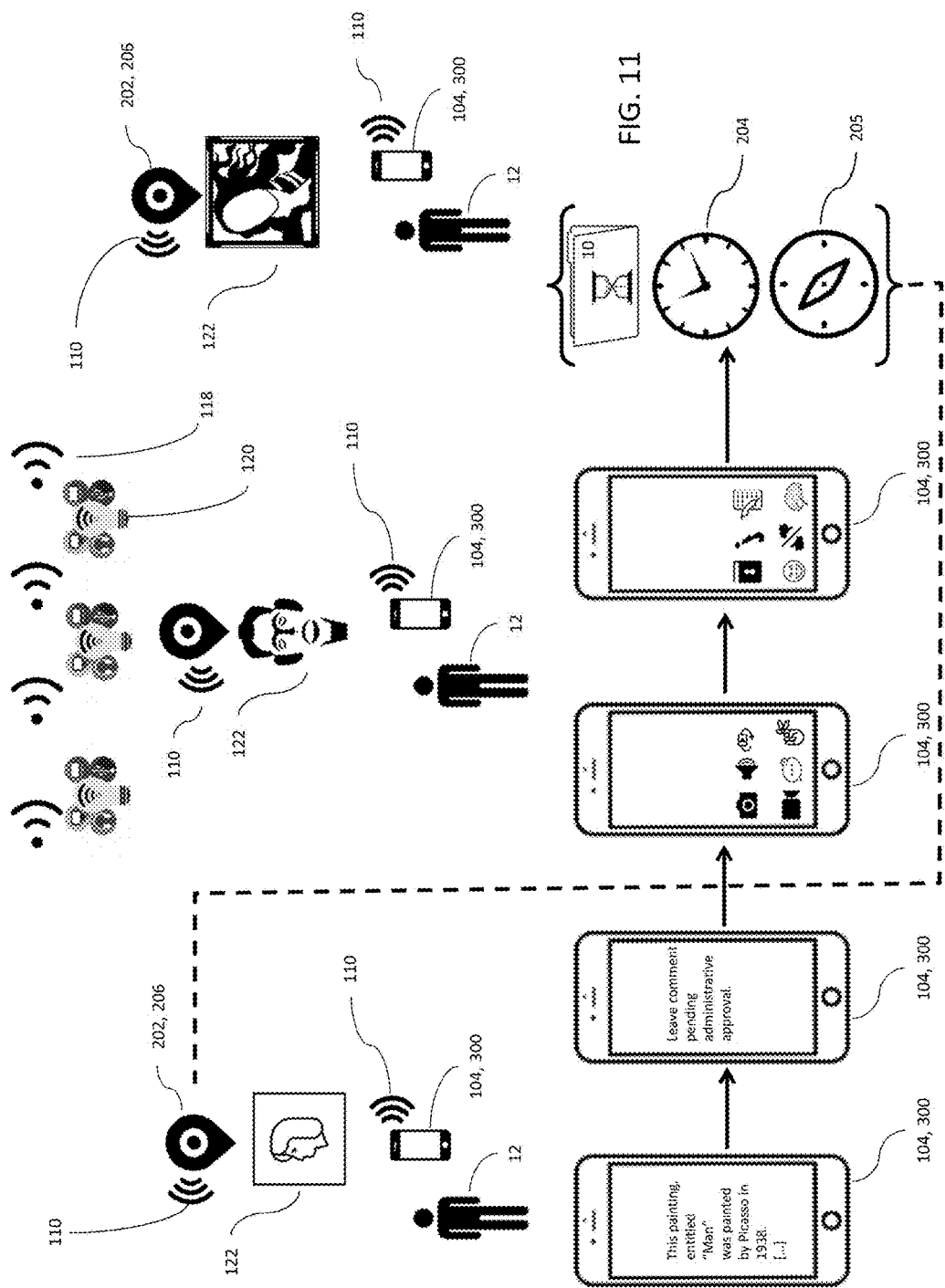

FIG. 11 illustrates, by example, the utilization of an embodiment of the present invention 100 in a museum. Users 12 may leave tagged moments 10 associated with art objects 122 containing editorial, opinion, and informational media or the like. WIKIPEDIA® like articles, encyclopedia entries, and the like may be appended to or be part of a moment 10. Likewise, content created by the system 100 may blend moment 10 content to form moment file 102 abstracts of a particular location or thing of interest. Additionally, a professional, such as a curator may leave moments 10 near objects 122. These professional comments (moments 10) may be commented on by other users 12 and shared within a small group or the like. In a preferred embodiment an administrator may first approve or reject moments 10 left within a geo-fenced area (around an object, within a facility) or the like. In this fashion, an authority may control the type of moment's readable/recordable. Likewise, paid moments 10 may be left on or about a facility tied to a particular activity 208 or object 122. Other monetization schema may also be employed, e.g., a subscription to the recordings of a particular recorder 12. A filter for filtering all commercial moments 10 may also be available for a subscription requiring a set number of recorded moments 10 over a particular period of time (or a small pecuniary fee). Subscription revenue (in at least one embodiment) may be wholly or partially distributed to an appropriate holder 1306 in the form of reduced fees or the like. Highly desirable moment content 10 may be associated with a brief, a paid announcement, or the like.

Figure 12:
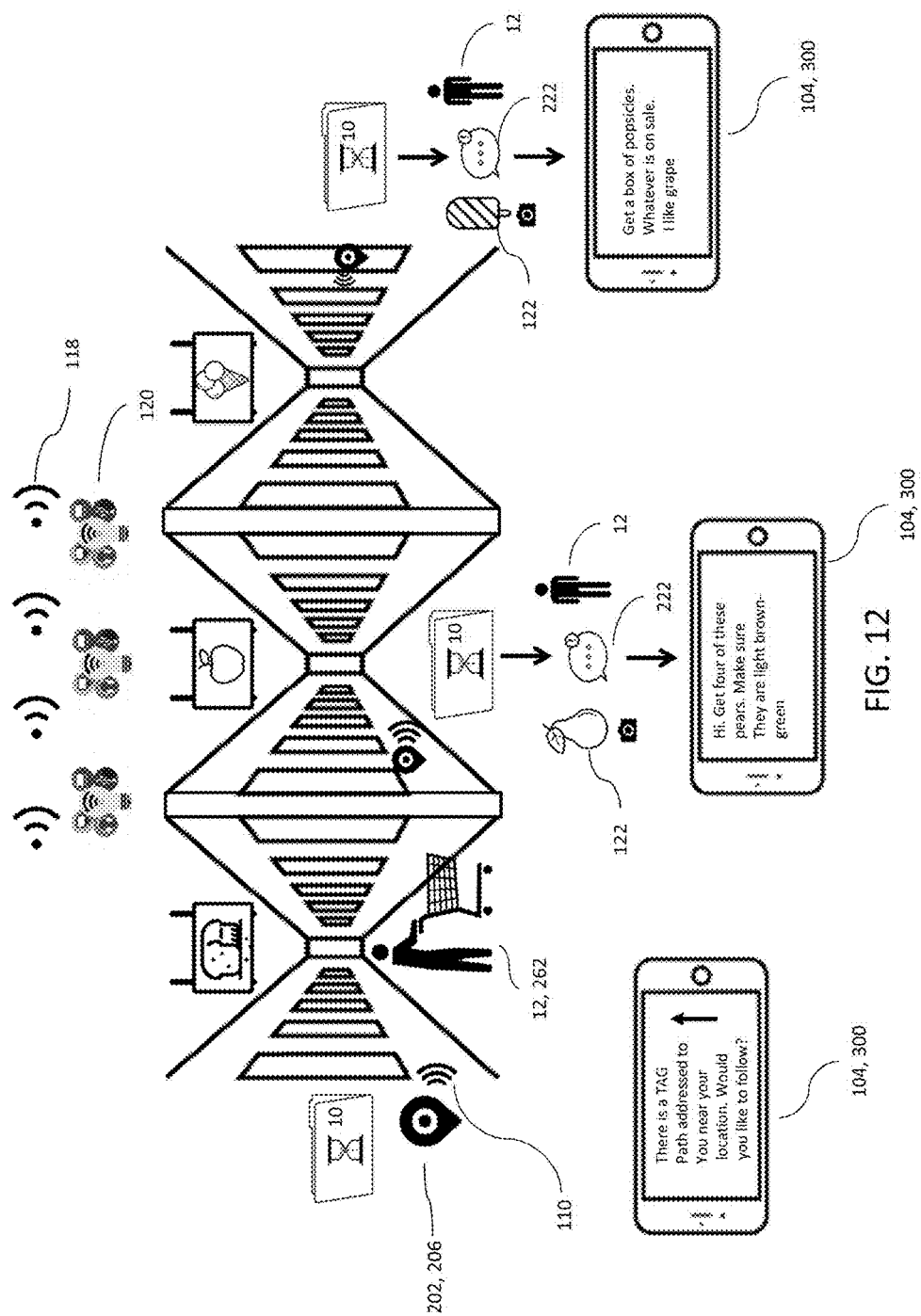

FIG. 12 illustrates an embodiment 100 of the invention in a retail environment. A user 12 might leave a plurality or moments 10 near and associated with grocery items and the like. A user desiring to make a particular recipe or the like might follow a plurality of moments 10 within a grocery store or the like to purchase the correct or desired items. A virtual shopping list may be created containing other suggested items necessary to fabricate a particular dish or the like. A significant other might leave shopping instructions 1202 for their partner. Likewise, coupons and discount related information might be interactively obtained by users 12 through moment files 102 of an embodiment of the invention 100. This provides vendors, product placement managers, marketing/advertising professionals, manufacturers, and storeowners to require proximity both in space and/or time to obtain a desirable moment 10. For example, at 8:00 AM a store might be otherwise in need of shoppers on any given day. In order to drive traffic into a store (venue) a scavenger hunt (breadcrumbs, spoor) contest or the like might be utilized to provide discounts or prize type interests for shoppers.

Figure 13:
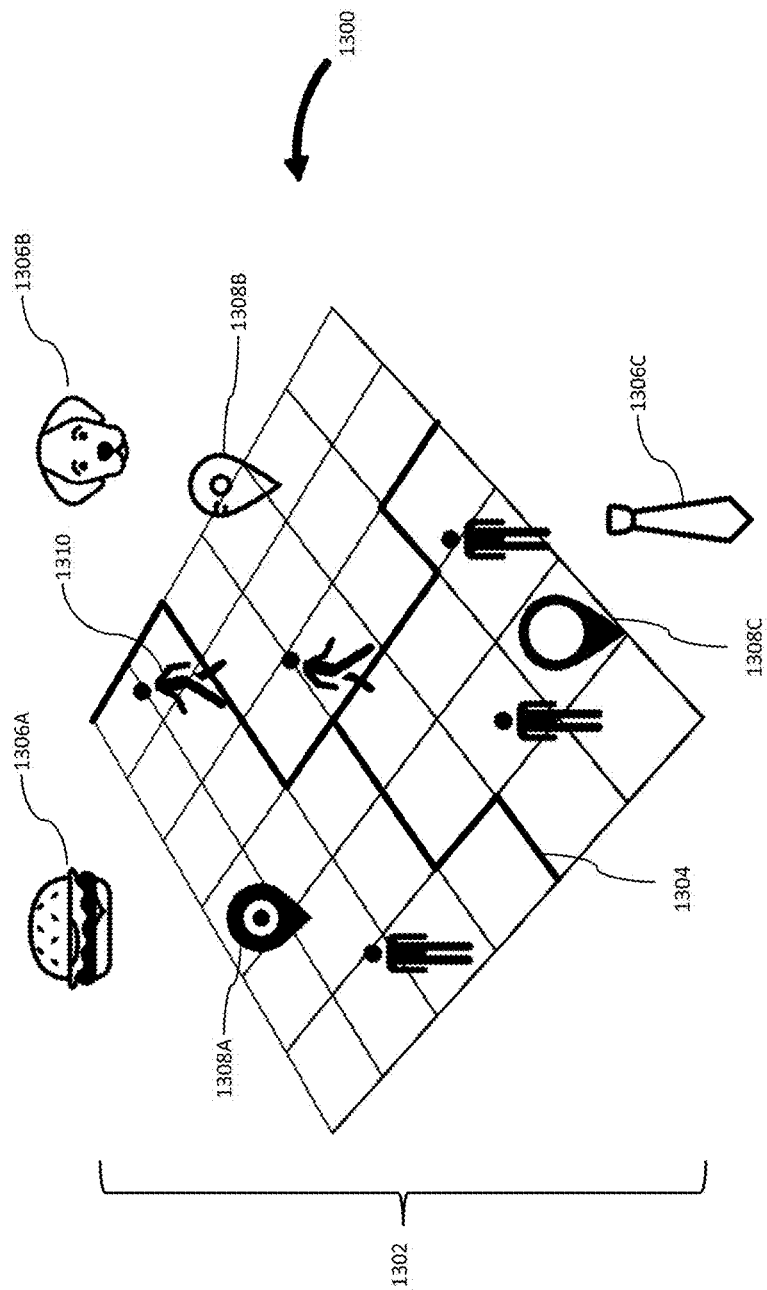
FIG. 13 is a highly schematic representation of an augmented property ownership (control) system for providing a rule of law based augmented property environment.

FIG. 13 illustrates an augmented property map 1302 based upon real property boundaries or virtual boundaries 1304 in accordance with at least one embodiment of the present invention 100. Users 12 may identify, price, bid on, purchase, negotiate, trade, rent/lease, borrow, and the like a parcel of augmented property 1300. Additionally, an owner/holder 1306 of a parcel of augmented property 1300 may restrict use and or prevent trespassing users 12 and their associated moment files 10. Moments 10 may only, for example, be left, accessed/enjoyed, and/or seen (visualized by a particular user 12) as provided by the system 100 (in at least one embodiment 100).

In one embodiment users 12 gaining access to a particular location 202 by being physically present in the location may receive some haptic response (ping) originating from the system 100 to a user's 12 enrolled handy 104, or from a holder 1306 interested in separately interacting with a particular user 12 reading/recording 300/200 a moment file. A virtual property ownership system 1300 may include an augmented (virtual) map 1302 augmenting real or contrived boundaries 1304 such that an owner 1306 of augmented property may monetize system 100, users 12, moment file 10 recording/reading 200/300. Augmented property holder 1306 (i.e., 1306A, 1306B, 1306C) identification may be designated with a holder 1306 moment file 1308 which must be accessed/played or the like in order for a user 12 to record or read a moment file 10. In one embodiment, a user moving 1310 across a boundary 1304 into another holders' 1306 augmented property may be (or may not be) required to access the crossed into holders augmented property moment identification moment file 1308. A user's 12 time within an augmented estate, and/or number of previously viewed user holder based content moment files 1308, may modify the content of a holders' moment file 1308 so as to present either full, abbreviated, or no moment file content to said user. In another embodiment, a moment file 10 within an augmented property may be monetized. For example, a pecuniary fee may be required to record 200 or read 300 a moment 10 within an augmented property.

Figure 14:
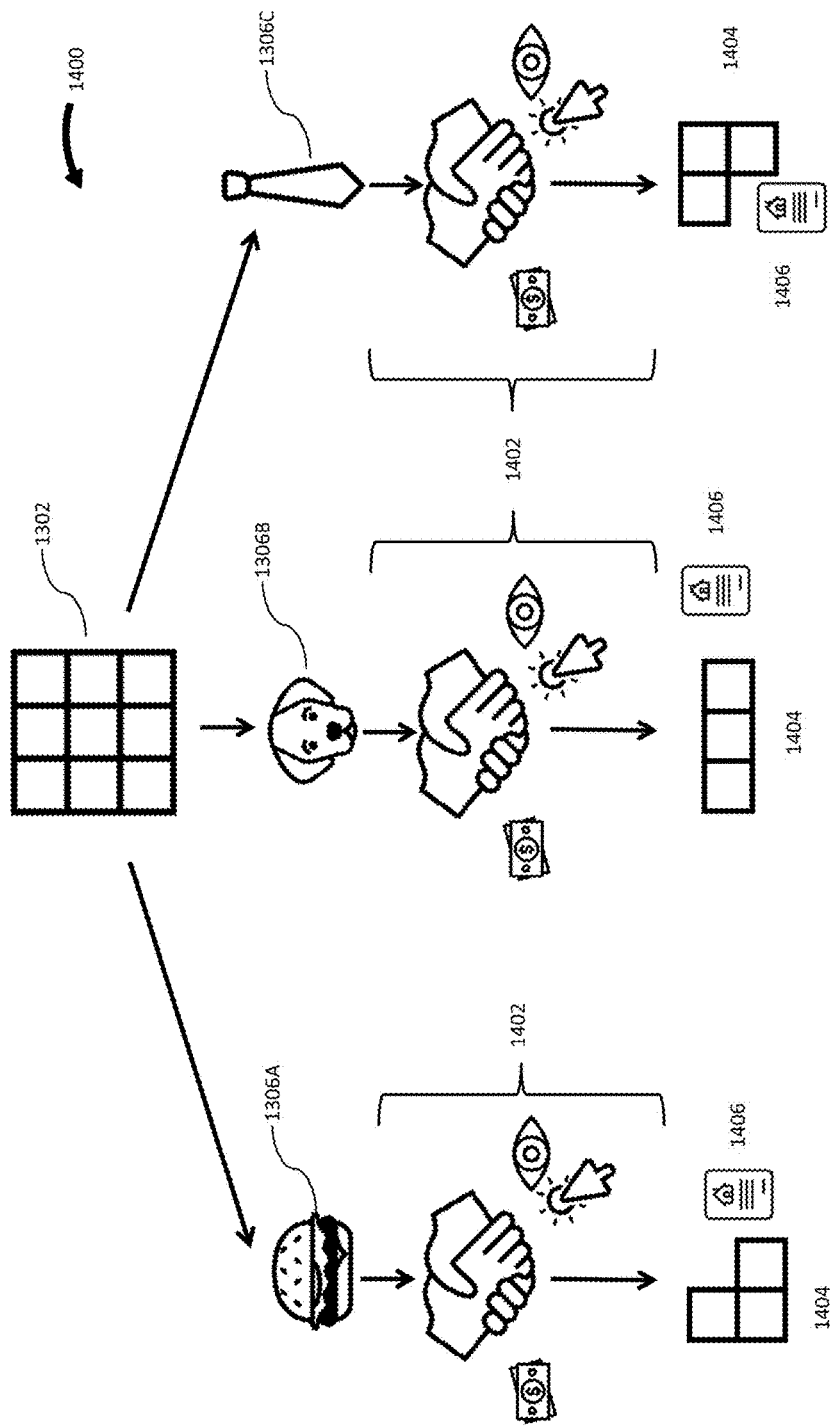
FIG. 14 is an augmented property purchasing flow diagram illustrating means for hypothecating, deeding, owning, obtaining, and divesting augmented property according to a rule of law based system.

FIG. 14 illustrates a currently preferred process for transferring augmented property in accordance with the system 100 of the present invention. The purchasing process 1400 includes an augmented property 1302 divisible temporally, by user population, by clicks, acreage (square meter), onerousness of holder moment 1308 content, by value and frequency of chits or coupons provided to users, coupon downloads, user traffic, and user feedback. Holder 1306 control over augmented property may be limited to actual real property ownership, fee simple, fee tail, temporal estate, lease, or license. An agreement 1402 may be utilized to describe terms and conditions incumbent on a purchasing holder's utilization of the augmented property 1404. Augmented property deeds 1406 may be freely or restrictedly hypothecated or traded in accordance with the agreement 1402.

Figure 15:
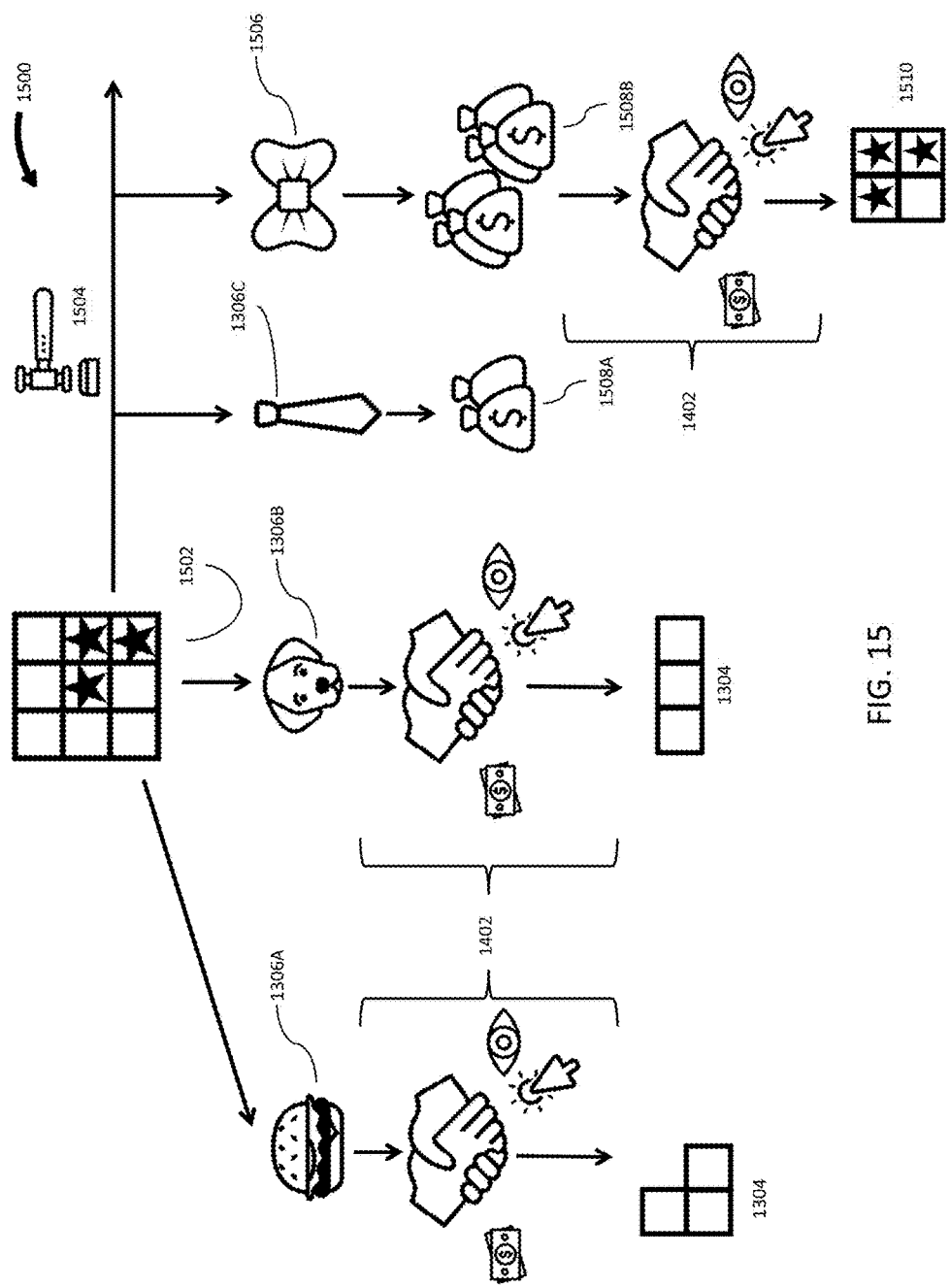
FIG. 15 is an augmented property auction flow diagram illustrating a means of monetizing an embodiment of the present disclosure.

Turning now to FIG. 15, an auctioning system 1500 for prized augmented property 1502 or a plot of augmented purchased property 1510 in an auction 1504 facilitated by the system 100 in accordance with auction standards (minimum bid, absolute, and reserve or the like). Competing bidders 1506 may combine interests, divide interests, and otherwise negotiate terms in accordance with the system 100 (auction system 1500 rules). Rules may be set forth in a system moment file 102 accessible to interested parties to the property 1502. Disputes may be decided via arbitration, a rating system, or the like. Funds 1508 may be distributed partially or fully to users providing moment file 102 content based upon user recorded moment 10 ratings, views or the like. The funds 1508 may also be distributed by the system 100 to users who access/read moment files 102 located in augmented property 1502 in the form of coupons or chits. These coupons or chits may be underwritten back to the holder 1306 by the system 100 in the form of reduced lease, rent, click, or property holder maintenance fees (or the like) payments to the system 100.

Figure 16:
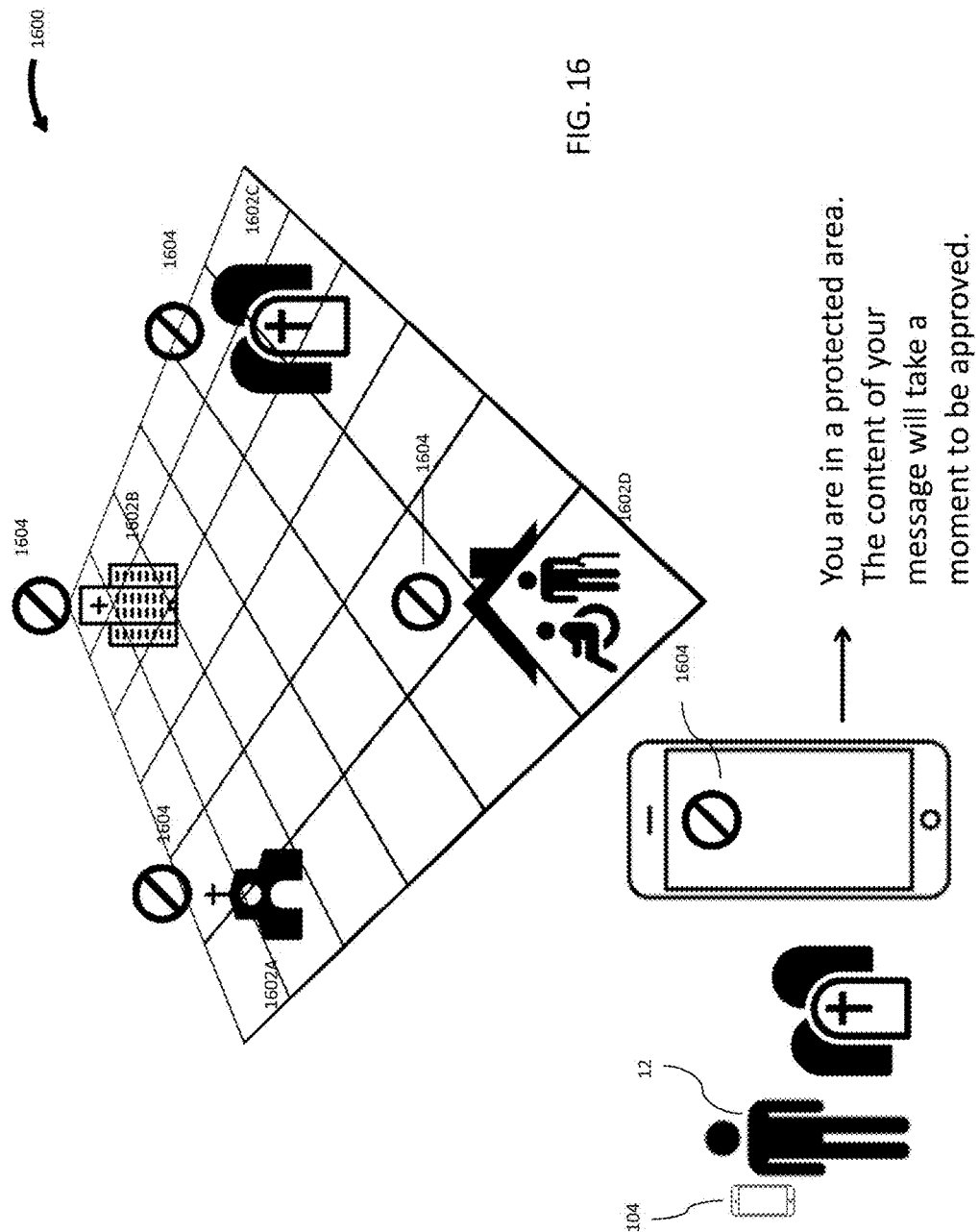
FIG. 16 is an environmental diagram of an augmented estate geo-fencing system of an embodiment of the present disclosure.

FIG. 16 illustrates a feature of an embodiment of the present invention restricting 1604 moment file 102 content recording or reading (viewing) within a augmented geofenced area 1602 (churches 1602a, temples 1602b, cemetery 1602c, nursing homes 1602d, schools, and the like). Holders 1306 may also purchase and then prevent all moment file 102 recording/reading 200/300 within the boundaries 1304 of their augmented property. Real property holders may seek condemnation (eviction) from the system 100 of an augmented property holder's 1306 interest, which is within the boundaries of the real property holder's estate.

Figure 17:
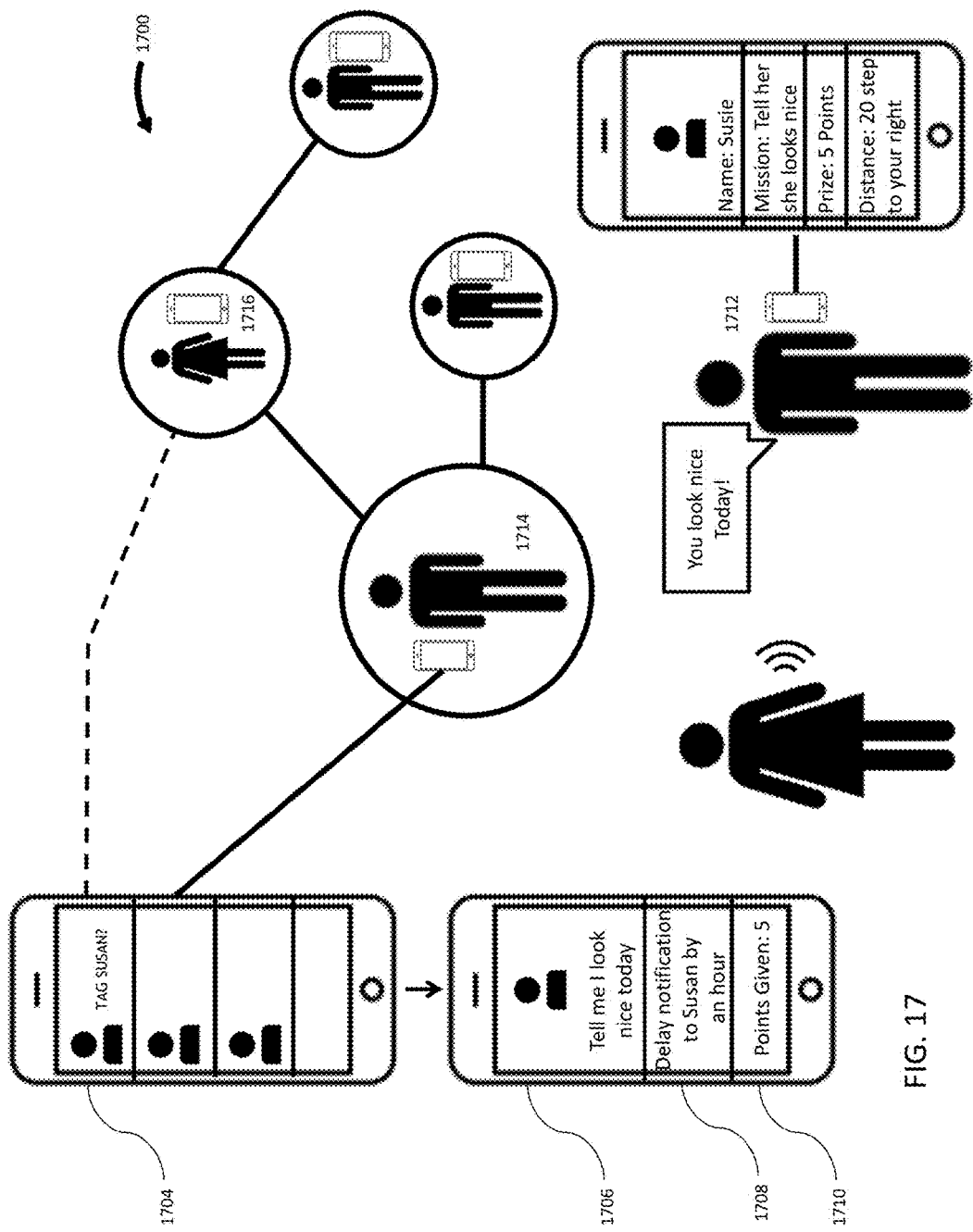
FIG. 17 is an environmental diagram illustrating an embodiment of the present disclosure capable of tagging moment files to a personal object (handy or the like) periodically moving with a user.

Turning next to FIG. 17, the system 100 may be utilized in a method 1700 to allow users 12 to tag other users 12 with moment file 102 content. The system may allow users to restrict moment file 102 content recording on the handy 104 location of another user (or the like) by group, content type, or the like. For example, a certain set of restrictions may allow a user in a group to tag 1704 another user 1716 in the group. Additionally another user 1714 in the group may view the moment 1706 tagged on a user in the group. A moment 1706 tag may also be viewable only after a delay 1708 from the time the tag was placed and provide a reward 1710 to a user 1712 that views and follows the instructions of the moment 1706. Generally, it is an object of the present invention to allow system 100 users 12 to control (restrict) moment files 102 posted about them, around them, on their property, by a particular user, group of users, and to otherwise restrict their participation with the system 100 and its users. Such restrictions may be free to users by moment file category, other user identity, moment file content, or the like (hate speech, speech designed to hurt a user or non-user, bullying, unwanted interactions, stalking, and the like are preferably controlled via the system 100 filter 106. Other acceptable but undesirable moment file 102 content may be restricted by (1) user participation level (higher utilization, measured, e.g., by moment file quality and content), or (2) by subscription. Users 12 may also control and designate members within their group, when and where they wish to be reminded of an available moment file 102 (do not notify [ping] while driving, at night, at work, in the theater, or the like). Users 12 may limit the radius of their interest to certain types of locations, users, geography, and the like.

Turning now to FIG. 18, a user interface for a multidimensional platform of the invention 100 (or the like) is illustrated. User interface icons 1800 may be displayed on a device such as a handy 104 (herein various handy 104 icons throughout the appended figures also signify fixed vehicle displays or heads-up-display (HUD) or the like), capable of operation in the system 100 as at least one or both of a moment recorder 200 and/or a moment reader 300.

Sample user interface icons 1800 for display are preferably representative of moment 10 content or subject. Users 12 may selectively sort, arrange, and categorize moments 10 (FIG. 2) they have read 300 or recorded 200. Additionally, the system 100 may provide sorting and categorization (e.g., FIG. 2 or the like) according to desired system 100 outcomes. For example, increasing usability, user participation and interest, according to a particular property holder's 1306 interest, or in accordance with some useful social goal (e.g., awareness of laws, dangers, and restrictions or the like). FIG. 18 illustrates an example sample set of moment icons 1800 for an embodiment of the present invention. For example temporary moments 1802 may be available to be read 200 (displayed and accessible) for a particular singular period of time or for a brief period of time on a reoccurring or randomly reoccurring basis according to a user 12, system 100, or holder 1306 goal. Additionally, moments 10 may signify an opportunity to chat 1804 with another user 12, the system, or a holder 1306. Moments 10 may also be grouped into families' or by category as signified by a single moment 10 user interface icon 1806. Such groupings may be established according to a particular user's 12 interests, by age, game playing field (serial or intersection game board tile/space) in an augmented reality user 12, holder 1306, or system 100 designed and/or administered game. For example, a requirement that a user 12 follow a particular path solving or achieving certain physical, mental, advertiser, or social tasks in order to achieve a particular goal (see, for example, FIG. 16). In another embodiment a key/password 1808 accessible moment 10 category may require an accomplishment or the like to obtain access to a moment 10. In such an embodiment or the like, sound 1810 moments 10 may be identified and characterized as containing a voice message, musical recording, or the like. Video or movie based moments 1812 (see also 218, 220 FIG. 2) and photograph based moments 1814 (see 214, FIG. 2) may also include a special interface icon 1800 moment file 10 designation. Users 12 may also design and utilize customized icons to designate their moment 10 content (an avatar or the like). Such customized icons may be available according to specified system 100 rules and or parameters.

FIG. 18 also illustrates other categories of sample moment 10 content which may or may not be available to all users 12. For example, a user 12 may be tagged with a moment 10 icon 1800 representing a personal message 1816 relevant to other users 12 or the like. In an operating embodiment of such a system 100, a user's handy 104 (vehicle or the like) might include an icon signifying some aspect or reputational value of such a user 12. Such a tagged user 12 might be tagged with a moniker or representation either positive or negative. Perhaps a particular user is a poor driver or doesn't obey traffic laws and or etiquette. In such a case they may be visible via a reader 300 of the system 100 wearing (designated by) a particularly designed icon 1800 representing a negative characteristic, e.g., litterer, speeder, thrasher or flamer, and the like; or a positive characteristic, e.g., expert, arbitrator, banker, employee, friend, redeemer, repairperson, troubleshooter, or the like. In one embodiment such a tagged user 12 could remove the tag only after demonstrating to the system 100 ameliorating conduct or the like (e.g., consistently obeying traffic rules, system 100 verified walking an area full of litter and then depositing the litter at a known refuse container or location). Likewise, positive monikers (tags) might be earned via ratings, moment recordings, training, and/or other system 100 designations or assignments. User location data may be required by the system 100 in order for a user to participate. Network-based, GNSS-based, handset-based, SIM-based, WiFi based, Vehicle to Vehicle (V2V), Automatic Vehicle Location (AVL), or other and/or hybrid based handy (vehicle) 104 location tools may be employed.

As previously described in the description of FIG. 2, opinions 310 may include a negative content 1818 moment file 10, and/or a positive content 1820 moment file 10. Users 12 of the system 100 may also achieve an award 1822 moment file 10 generated by another user 12, a holder 1306, or the system in a location a user is known to frequent which awards the user 12 with a designation or chit or the like.

In other embodiments of the system 100 (FIG. 18) a user 12 may leave directions 1824 or allow a user to turn system 100 features ON/OFF by accessing (reading 300) a system menu 1826 moment file 10. A user's reputation 1830 (biography or the like) may be designated via an icon 1830 worn about a user in the augmented reality of the system 100. Some moments 10 may be time sensitive 1828 or recorded as a reminder of an appointment, road work, weather hazard or the like. Notes and/or instructions 1832 moment files 10 may be categorized and represented by a special icon 1800. Likewise a user 12 can leave a love note 1834 moment file 10 for a particular user at a special place (accessible at any time or at certain times). Dashboard moment files 1836 may be dispersed geographically providing users 12 with information about new features, changes, statistics, offers, and the like. Likewise, dashboard moments 1836 may provide a moment locator (moment radar) or clues relevant to a particular user/moment, class of user/moment, or the user/moment population.

So as to provide an enhanced social experience for users at least one embodiment may include drifting moments 10 designated by an icon 1838. Such moments may change location by time, user activity, holder 1306 requirements, or according to a pseudo-random operation of the system 100. In other embodiments, users may leave information or instructions designated with a special moment icon 1840. Such information may include the legacy of an historic building, or an acknowledgement of the location where a world record was set. In other embodiments, users 12 may leave moment files 10 asking questions of an unknown but more knowledgeable user, or a known user, or a user with special characteristics. Such question moments 10 may be designated with a special moment icon 1842 ("Did anyone witness _____ on _____"). Also available in a preferred embodiment of the system 100 are "easter egg" moments 10 (treasures) designated by an icon 1844 which provide user interest available from a holder 1306, another user 12, or the system 100 (specifically tailored for a particular user or the like). Other embodiments may include game or puzzle moments 10 designated by an icon 1846 where reading 300 such a moment may entitle a user to puzzle or game play (relevant to the geography, place or the like) where success earns chits or the like.

Cross-platform access may be provided by special 1848 moment content 10 allowing integration with users of other platforms or groups providing entertainment, tools, skills, or items valuable for trade in the system 100 or another platform.

As designated by an X 1850 representing a thing or object of real property 1852, personal property 1854 (stationary or a fixture 1854A or movable or portable 1854B), and virtual 1856, the system 100 may augment any of these forms of property with a user recordable/readable moment file 10.

Figure 19:
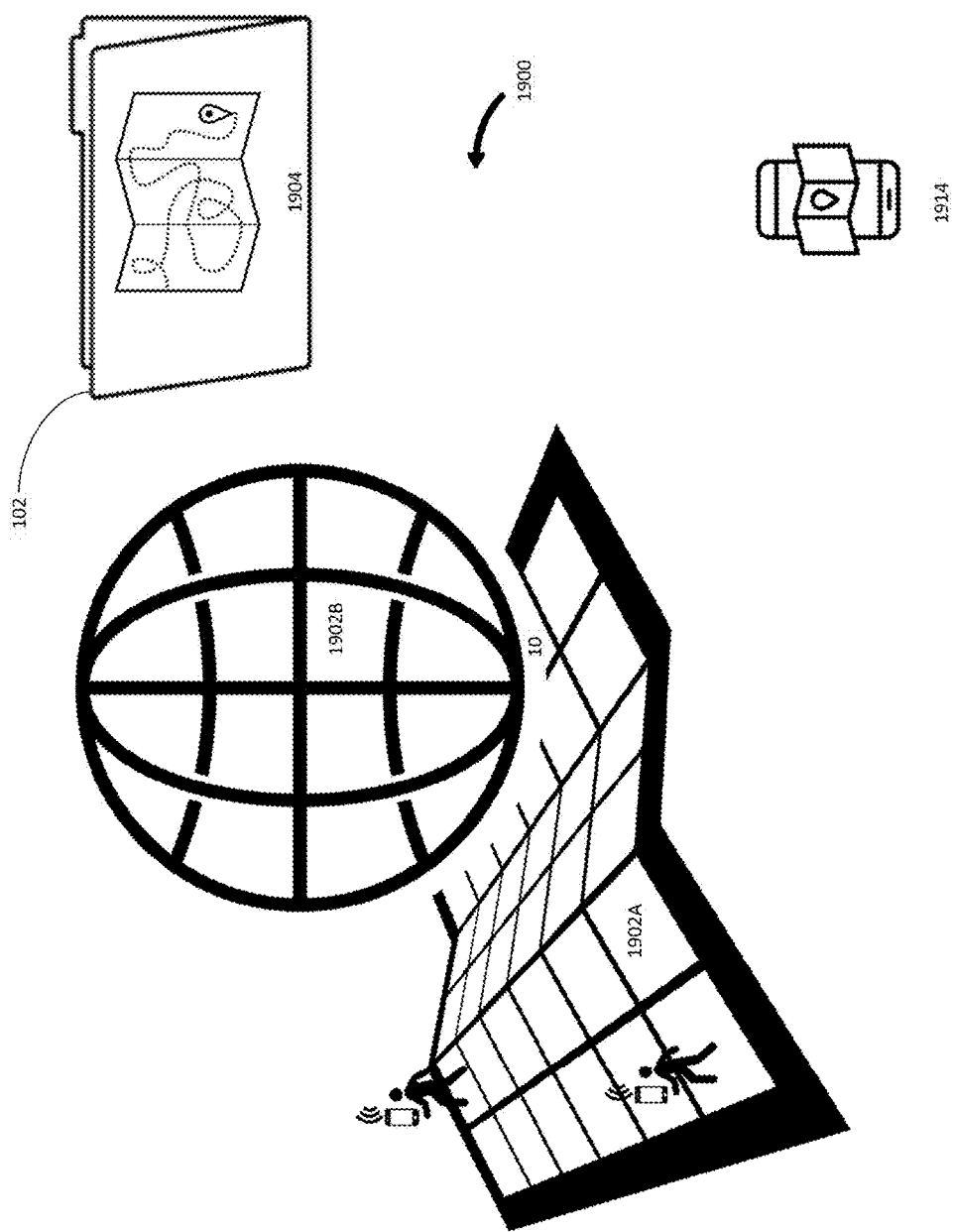
FIG. 19 is an environmental diagram illustrating a moment file based game for play on an unbounded or bounded augmented playing area based upon at least the real world and its real estate, the chattels distributed thereon, and a virtual space with or without defined boundaries.

Turning now to FIG. 19, a game player (user 12), a property holder 1306, the system 100, or the like may design a game 1900 with static rules, or rules which change according to time of day, day of week, player accomplishment, detours, player misdirection, or the like. A player 12 may be required to access a series of moments 10 placed randomly or intelligently across a bounded 1902A or unbounded 1902B real (or real and virtual or real and augmented) area in a particular order with or without solving a physical, mental, or social problem characterized by recording a moment 10 or the like at a particular location within a given time period or at a particular step. A user 12 may use a game play handy 1914 or the like to participate in reading/recording (300/200) moment files 102 in accordance with game rules/instructions 1904 represented by a game play instruction icon 1904 moment file 102.

Figure 20:
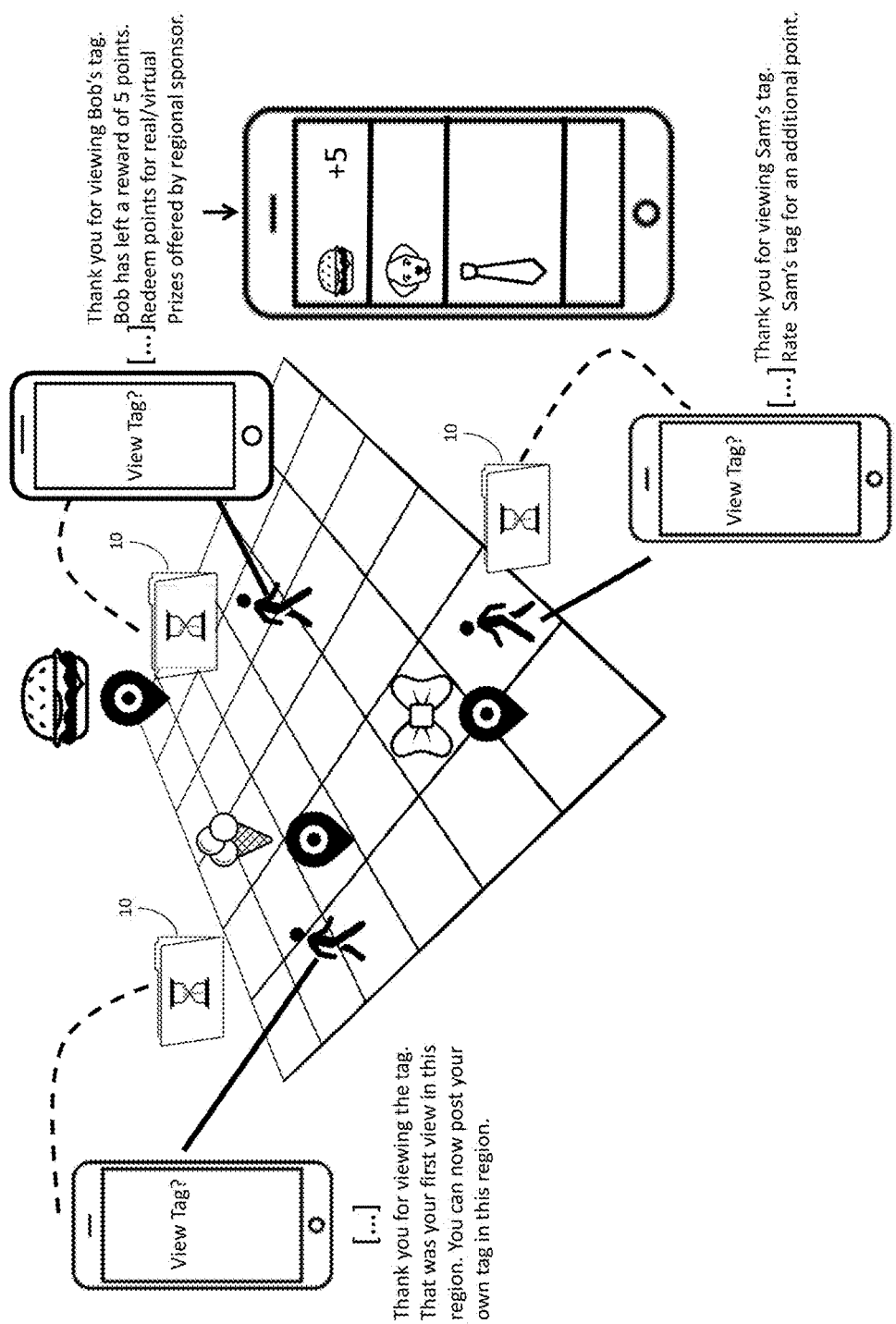
FIG. 20 is an environmental diagram of an awards system based upon a user characteristic such as participation as an embodiment of the present disclosure.

FIG. 20 illustrates a method of the system 100 for rewarding users 12 by how the user community rates a user's recorded moment 10 content.

In various preferred embodiments and implementation of the invention both handy absolute and relative positioning sensors may be utilized. Comparison of position results may be utilized to generate one or more of a refined position and a refined orientation by resolving at least one position ambiguity associated with one or more of the initial position and the initial orientation to an achievable confidence level. The handy may include at least one of a vehicle, smart device, tablet, wearable device, head worn display (HWD), or other like portable electronic device.

A handy processor may generate (or record) a moment file preferably including moment position data (including at least a moment position, a moment orientation and a moment time) and recorder attributes corresponding to the enrolled handy recording the moment file or the moment file itself. Recorder attributes may include a recorder ID (uniquely identifying the recording handy or the recording individual) and recorder filters (e.g., filters or constraints introduced into the moment file by the recorder which determine the readers, or groups of readers, to which the moment file may be visible or accessible). Recorder filters may include a recorder permission, a moment age (or duration), a moment creation time, a moment medium, a moment subject or interest, and a moment theme. A recorded moment file may include elements of filterable content, e.g., an image or image stream, a video clip, a sound recording, a text file, a mood, a place, or an activity. A moment file may include augmented reality icons representative of one or more of the first moment file (or, e.g., its component content elements or its recorder). In a preferred implementation a system of the present disclosure will include a server for retrieving at least one augmented reality icon of a previously recorded moment file "placed" in its designated location, e.g., by being uploaded by the recorder to the server for potential access by other reading handys. For example, a reading handy may access a moment file based on the proximity of the handy's current location to a location associated with the moment file (depending on recorder-introduced or reader-introduced filters). If available positioning signals are diminished or intermittently transmitted, or ambiguities exist between positioning sensors of a handy, the handy processor may resolve these ambiguities to a given confidence level (and thereby determine proximity to a moment file) by, e.g., weighting a position source (absolute or relative) most likely to provide the greatest accuracy given the location of the last position reported. Accordingly, the enrolled handy may retrieve from the server (or other like cloud-based resource where generated augmented reality content is stored) an augmented reality icon corresponding to a moment file to be read during such periods of diminished, intermittent, or absent externally transmitted positioning signals.

Recorder filters and reader filters, respectively, may assist the user of a handy in filtering moment files according to a variety of characteristics, e.g., a reader permission; a moment age, creation time, medium, subject or interest, and theme. A recorder of a moment file may incorporate recorder filters into the moment file to restrict access to the moment file, while a reader may establish customizable reader filters specific to a handy to narrow the potential variety of accessible moment files according to reader interests. Readers may utilize a preferred enrolled handy to locate, retrieve, and view (via a display of the handy) moment files by interacting with the augmented reality icon or icons associated with the moment file. For example, proximity considerations, recorder filters, and reader filters may determine whether a given icon is displayed to a reader; the reader may then access other content elements of the file by interacting with (e.g., clicking) the icon.

Absolute and relative position sources of a handy may include, for example, a GNSS positioning system (GPS, GLONASS, Galileo, Beidou), a WiFi positioning system (WPS or WiPS/WFPS), a vehicle positioning system (VPS), a vehicle to vehicle positioning system (v2v), an inertial measurement unit (IMU) reporting at least one of relative position, orientation, velocity, and heading; a Received Signal Strength Indicator (RSSI) system; and/or a computer vision system configured for one or more of motion detection and area mapping. Preferably enrolled handy IMUs include a magnetometer, an accelerometer, a gyro sensor, and a gyroscope. Position data associated with a moment file may include a point in space, a point of origin, a waypoint, or a destination (e.g., if the moment file is recorded aboard, or intended to be read aboard, a moving vehicle). Such handy sensors may determine velocity as a change in position over time, e.g., to determine a locomotive source. For example, the locomotive source may be determined by an approximation of velocity and location (or a user reported locomotive source). Moment files may also include duration and a termination time; for example, the recorder may incorporate a duration time into the moment file, after which the moment file ceases to exist or is no longer accessible.

In filterably selecting moment file augmented reality icons for display on a user's handy, identifiers and filters (recorder-based or reader-based) may preferably include a character string and matrix, where each character and character position in the string or matrix is indicative of a characteristic of respective ones of a plurality of recorders, readers, and filters. Where such a string or matrix is utilized, the inclusion and position of must match characters, need not match characters, or wildcard character may indicate the theme, class, location, user, category, and location type of moment files to be displayed or not displayed.

In other preferred embodiments an enrolled handy may calculate position data of a moment file to be read or accessed as a defined locus to the moment file, whereby the handy processor may retrieve an augmented reality icon or icons of the moment file when the location of the handy corresponds to the defined locus. The defined locus may be, for example, a circle or freeform shape having a radius or other dimensions defined by the recorder.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

We claim:

1. An enrolled handy for recording and reading filterable content represented by an augmented reality icon, comprising:
   (a) a positioning system including at least one absolute positioning sensor and at least one relative positioning sensor, the positioning system configured to determine one or more of an initial position and an initial orientation via one or more of the absolute positioning sensor and the relative positioning sensor;
   (b) at least one processor coupled to the positioning system and programmed to:
      (1) generate one or more of a refined position based on the at least one initial position and a refined orientation based on the at least one initial orientation by resolving at least one position ambiguity associated with one or more of the absolute positioning sensor and the relative positioning sensor;
      (2) output first position data including one or more of the initial position, the initial orientation, the refined position, and the refined orientation;
      (3) generate at least one recorded moment file of a plurality of moment files, each moment file comprising:
         (A) second position data including at least a moment position, a moment orientation and a moment time;
         (B) at least one filterable content recorder attribute corresponding to one or more of the enrolled handy and the moment file, the at least one recorder attribute including one or more of a recorder identifier and a recorder filter, the recorder filter including one or more of a recorder permission, a moment age, a moment creation time, a moment medium, a moment subject or interest, and a moment theme;
         (C) one or more elements of the filterable content recorder attribute including at least one of an image, a video clip, a sound recording, a text file, a mood, a place, and an activity; and
         (D) at least one augmented reality icon representative of one or more of the moment file and the one or more elements;

(4) transmit the at least one recorded moment file to at least one server;

(5) retrieve from the at least one server at least one augmented reality icon of a read moment file of the plurality of moment files, based on one or more of the proximity of the second position data of the read moment file to the first position data, the at least one recorder filter, and at least one filterable content reader attribute associated with the enrolled handy, the filterable content reader attribute including at least one of a reader identifier and a reader filter, the reader filter including one or more of a reader permission, the moment age, the moment creation time, the moment medium, the moment subject or interest, and the moment theme; and (6) retrieve from the at least one server the at least one read moment file via the retrieved augmented reality icon; and (c) at least one display unit coupled to the processor and configured to display, based on one or more of the second position data and the first position data, one or more of:

(1) an image associated with an environment proximate to the enrolled handy;

(2) the at least one augmented reality icon; and (3) the one or more filterable content recorder attributes.

2. The enrolled handy of claim 1, wherein the positioning system includes at least two of:

(a) a GNSS positioning system (GPS, GLONASS, Galileo, Beidou), (b) a WiFi positioning system (WPS or WiPS/WFPS), (c) a vehicle positioning system (VPS), (d) a vehicle to vehicle positioning system (v2v), (e) an inertial measurement unit (IMU) reporting at least one of relative position, orientation, velocity, and heading;

(f) a Received Signal Strength Indicator (RSSI) system; and (g) a computer vision system configured for one or more of motion detection and area mapping.

3. The enrolled handy of claim 2, wherein the inertial measurement unit (IMU) of an enrolled handy includes at least two of a magnetometer, an accelerometer, a gyro sensor, and a gyroscope.

4. The enrolled handy of claim 2, wherein the proximity of the second position data of the read moment file to the first position data is determined based on a diminished or an intermittent externally transmitted signal for positioning and one or more measurements of the positioning sensors.

5. The enrolled handy of claim 2, wherein the second position data further includes a locomotive source when the locomotive source has been determined by at least one of an (i) approximation of velocity and location or (ii) a reported locomotive source from a user.

6. The enrolled handy of claim 1, wherein the moment time includes at least one of a duration and a termination time associated with one or more of the recorded moment file and the read moment file.

7. The enrolled handy of claim 1, wherein one or more of the recorder identifier, the recorder filter, the reader identifier, and the reader filter includes at least one of a character string and matrix, wherein each character and character position in the at least one string and matrix is indicative of a characteristic of respective ones of a plurality of recorders, readers, and filters.

8. The enrolled handy of claim 7, further comprising must match characters, wherein each characteristic selected is selected via at least one must match character in the at least one of a character string and matrix.

9. The enrolled handy of claim 8, wherein at least one character and character position in the string or matrix is an anything else but the corresponding must match character.

10. The enrolled handy of claim 7, further comprising a need not match or wildcard character, wherein each characteristic not selected is not selected via a need not match character or a wildcard character in the at least one of a character and character position in the string or matrix.

11. The enrolled handy of claim 1, wherein the second position data includes one or more of a point of origin, a waypoint, or a destination.

12. The enrolled handy of claim 1, wherein:

the second position data includes a defined locus to the read moment file; and the at least one processor is configured to retrieve from the at least one server the at least one augmented reality icon of the read moment file based on the at least one filterable content recorder attribute when the first position data of the enrolled handy corresponds to the defined locus.

13. The enrolled handy of claim 12, wherein the defined locus includes a circle having a radius defined by a recorder of the read moment file.

14. The enrolled handy of claim 1, wherein the at least one processor is configured to retrieve from the at least one server the at least one augmented reality icon of the read moment file during a diminished, an intermittent, or an absence of an externally transmitted signal for positioning.

15. The enrolled handy of claim 1, wherein the enrolled handy includes at least one of a vehicle, a smart device, a tablet, a wearable, a head worn display, or other portable electronic device.

* * * * *